United States Patent
Ota

(10) Patent No.: US 8,689,393 B2
(45) Date of Patent: Apr. 8, 2014

(54) CLEANING DEVICE FOR SUNLIGHT COLLECTING DEVICES IN A SOLAR THERMAL ELECTRIC POWER GENERATION SYSTEM

(75) Inventor: Hideaki Ota, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 623 days.

(21) Appl. No.: 13/055,133

(22) PCT Filed: Jan. 14, 2009

(86) PCT No.: PCT/JP2009/000099
§ 371 (c)(1),
(2), (4) Date: Jan. 20, 2011

(87) PCT Pub. No.: WO2010/026673
PCT Pub. Date: Mar. 11, 2010

(65) Prior Publication Data
US 2011/0126378 A1 Jun. 2, 2011
US 2012/0036676 A9 Feb. 16, 2012

(30) Foreign Application Priority Data

Sep. 4, 2008 (JP) ................................. 2008-226812

(51) Int. Cl.
*A47L 5/00* (2006.01)
(52) U.S. Cl.
USPC ............. 15/312.1; 15/319; 15/320; 15/340.3; 15/367; 15/368
(58) Field of Classification Search
USPC .......... 15/312.1, 319, 320, 340.1, 340.4, 367, 15/368
IPC ....................................................... A47L 5/00
See application file for complete search history.

(56) References Cited

U.S. PATENT DOCUMENTS

| 5,613,261 A | 3/1997 | Kawakami et al. |
| 5,806,317 A | 9/1998 | Kohler et al. |

(Continued)

FOREIGN PATENT DOCUMENTS

| EP | 0526816 | 2/1993 |
| EP | 1073095 A2 | 1/2001 |

(Continued)

OTHER PUBLICATIONS

ISA Japan, International Search Report of PCT/JP2009/000099, Feb. 17, 2009, 3 pages.

(Continued)

*Primary Examiner* — David Redding
(74) *Attorney, Agent, or Firm* — Alleman Hall McCoy Russell & Tuttle LLP

(57) ABSTRACT

A device for cleaning a collector of a solar thermal electric power generation system is provided which does not need to secure any water source or the like and which improves the flexibility of selection of a place for installing the solar thermal electric power generation system. The cleaning device includes an air supply device and an air nozzle configured to blow air supplied from the air supply device, which are mounted on a self-propelled truck. The cleaning device is capable of blowing air blown from the air nozzle against a sunlight reflecting surface of a collector to clean up the sunlight reflecting surface. The air nozzle is configured to be capable of moving up and down. The cleaning device further includes a soiling degree measuring device for measuring soiling degrees of the sunlight reflecting surface before and after air blowing by the air nozzle.

23 Claims, 18 Drawing Sheets

(56) References Cited

U.S. PATENT DOCUMENTS

| | | | |
|---|---|---|---|
| 6,523,221 B1 * | 2/2003 | Dahlin et al. | 15/314 |
| 8,240,320 B2 * | 8/2012 | Mertins et al. | 134/172 |
| 8,437,875 B2 * | 5/2013 | Hernandez et al. | 700/245 |
| 8,500,918 B1 * | 8/2013 | Meller et al. | 134/56 R |
| 2006/0225729 A1 | 10/2006 | Litwin | |
| 2010/0212654 A1 * | 8/2010 | Alejo Trevijano et al. | 126/602 |
| 2013/0186430 A1 * | 7/2013 | Ehm et al. | 134/1.1 |

FOREIGN PATENT DOCUMENTS

| | | |
|---|---|---|
| EP | 1818626 | 8/2007 |
| JP | 50122469 | 10/1975 |
| JP | 59142399 | 8/1984 |
| JP | 60229836 | 11/1985 |
| JP | 62106247 | 5/1987 |
| JP | 2280884 | 11/1990 |
| JP | 6320126 | 11/1994 |
| JP | 7108243 | 4/1995 |
| JP | 10196129 | 7/1998 |
| JP | 10281565 | 10/1998 |
| JP | 10311011 | 11/1998 |
| JP | 2003300030 | 10/2003 |

OTHER PUBLICATIONS

Israel Patent Office, Notice of Deficiencies in Israel Patent Application No. 207,318, Apr. 28, 2013.

* cited by examiner

CLEANING DEVICE FOR SUNLIGHT COLLECTING DEVICES IN A SOLAR THERMAL ELECTRIC POWER GENERATION SYSTEM

TECHNICAL FIELD

The present invention relates to a cleaning device for cleaning sunlight reflecting surfaces of sunlight collecting devices arranged in lines in a solar thermal electric power generation system. More specifically, the invention relates to a cleaning device for removing dust and dirt that are likely to deposit on the sunlight reflecting surfaces of such sunlight collecting devices.

BACKGROUND ART

Unlike electric power generation using fossil fuels, solar thermal electric power generation utilising solar thermal energy is a technique capable of satisfying energy demand without affecting the earth's environment. That is, solar energy is a stable zero-cost energy source taking the place of fossil fuels. Further, the adoption of solar thermal electric power generation system makes it possible to prevent a great deal of emissions of carbon dioxide, and hence can contribute to the prevention of global warming.

FIG. 10 is a schematic view showing a solar thermal electric power generation system. In the electric power generation system shown, sunlight collecting devices (hereinafter will be referred to also as "collectors") 52 installed in a sunlight collecting area (i.e., solar field) collect solar energy by means of a heat transfer medium absorbing the solar energy as thermal energy. A special oil is used as the heat transfer medium. The oil absorbs solar heat to assume a high-temperature condition (at about 400 degrees C. for example), circulates through circulation pipelines 54 and 55 by means of a circulation pump 53, radiates heat in a heat exchanger 56 to produce steam, and then assumes a low-temperature condition (at about 300 degrees C. for example), and returns to the collectors 52. In the heat exchanger 56, water fed thereto by a feed pump 68 is evaporated into saturated steam, which in turn passes through steam supply piping 57 to reach a superheater 58. The superheater 58 turns the steam fed thereto into superheated steam, which drives a steam turbine 59 to rotate an electric power generator G, thereby generating electric power. Reference numeral 69 in FIG. 10 designates a condenser 69. The electric power generation system is provided with thermal storage equipment 70. As is often the case with such a solar thermal electric power generation system, the thermal storage equipment 70 is provided for continuing electric power generation by storing a part of solar thermal energy collected during the daytime in the form of thermal energy and emitting it to generate steam when sunset draws near.

Such sunlight collecting devices are roughly categorized into a tower type, a parabolic trough type, a Fresnel type, and the like. Of these types, the parabolic trough type is mostly used for large-scale electric power generation system.

As shown in FIG. 11, a parabolic trough type collector 52 reflects sunlight by a trough-shaped curved reflecting mirror 60 having a parabolic cross section in an X-Y plane and collects reflected sunlight on its focal point. A heat absorbing tube 61 extends through the focal point along the Z-axis. The heat transfer medium circulates in such heat absorbing tubes 61 to absorb the solar heat, thereby collecting the solar heat. Each heat absorbing tube 61 has ends each provided with a swivel joint (not shown) for rotatable and swingable connection with a connector pipe (not shown) connecting to a heat absorbing tube of an adjacent line of collectors 52.

The solar thermal electric power generation system generates electric power only during the daytime. The intensity of solar thermal energy increases as the sun goes up from sunrise to culmination and decreases as the sun goes down from culmination to sunset. Therefore, a steam turbine electric power generation system relying upon solar heat is at rest during the nighttime and restarted as the sun rises. An integrated solar combined cycle electric power generation system, in which the above-described solar thermal electric power generation system is combined with a highly efficient gas turbine electric power generation system, continues electric power generation through day and night by driving a gas turbine also (see European Patent Laid-Open Publications Nos. 0750730 and 0526816 for example).

In the solar thermal electric power generation system described above, each collector 52 is caused to turn about a rotating shaft 65 during the daytime so that its reflecting surface (i.e., sunlight reflecting surface) 52a is oriented to the sun constantly. In many cases, a desert region is selected as a place for installing such a solar thermal electric power generation system. Such a region is in a dry condition because of few rainy or cloudy days. Therefore, when a wind blows, dust is likely to be raised and deposited on the reflecting surface of each collector 52. Deposition of dust and dirt forms a soiled portion on the reflecting surface, which reduces sunlight reflection efficiencies, thus resulting in a reduced collection of the solar thermal energy.

Conventionally, it has been a common practice to remove dust and the like depositing on a collector by cleaning with water in the nighttime when solar heat cannot be collected or in the daytime when the electric power generation system is stopped for cleaning the collectors. Specifically, cleaning water is sprayed against the reflecting surfaces of the collectors 52 from a spray nozzle while a sprinkling truck provided with a water tank is running between adjacent lines of collectors 52, thereby removing dust and the like. However, a document is not known in relation with a cleaning device for sprinkling water onto the reflecting surfaces 52a of collectors 52.

However, cleaning with water cannot be effected in a region where it is difficult to secure a water source having sufficient amount of water or in a place where it is difficult to get water from a water supply station. Even when such a water source or the like is secured, in a place under a bad water supply condition, cleaning water has to be frequently brought from a water supply station by a tank truck or the like, hence, an increase in operation cost is unavoidable. When the cleaning water contains impurities, another problem arises that these impurities remain on the reflecting surfaces after the water has dried, thereby lowering the reflection efficiency thereof. Thus, a water source or a water supply station tends to become a limiting condition when selecting a place for installing a solar thermal electric power generation system.

DISCLOSURE OF THE INVENTION

Problems to be Solved by the Invention

The present invention has been made in order to solve the foregoing problems. Accordingly, it is an object of the present invention to provide a cleaning device for cleaning a sunlight collecting device of a solar thermal electric power generation system, which does not need a good-quality water source and which improves the flexibility of selection of a place for installing the solar thermal electric power generation system.

Means for Solving the Problems

In order to accomplish the foregoing objective, the present invention provides a cleaning device for cleaning a sunlight reflecting surface (hereinafter also simply referred to as "reflecting surface") of a sunlight collecting device included in a solar thermal electric power generation system, which comprises: an air supply device; and an air nozzle configured to blow air supplied from the air supply device, wherein the air blown from the air nozzle is blown against the sunlight reflecting surface to clean the sunlight reflecting surface.

Since dust and the like are blown off the reflecting surface by blowing air, which is inexhaustible in any region, without using water for cleaning, a limitation does not exist when selecting a place for installing the solar thermal electric power generation system. Further, there is no need to consume a large amount of cleaning water, which is especially valuable in a desert area. Moreover, the cleaning device has a simplified structure since the cleaning device is an air blowing device.

Preferably, the cleaning device further comprises a movable truck, wherein the air supply device and the air nozzle are mounted on the truck. This is because the provision of such a truck makes it possible to sequentially clean up reflecting surfaces arranged over a wide area while moving the air supply device and the air nozzle by its self-propelled travel or its travel by other traction means.

More preferably, the truck is provided with a travel driving device by which the truck is rendered capable of self-propelled traveling.

The cleaning device may include a driving device configured to extend and retract the air nozzle in an air blowing direction thereof for moving a top end of the air nozzle toward and away from the reflecting surface, such that a range of extension and retraction of the air nozzle is adjusted. By moving the top end of the air nozzle closer to the reflecting surface, the blown air can be concentrated on a soiled portion.

The cleaning device may include a driving device configured to move the air nozzle in a direction in a plane defined by an air blowing opening of the air nozzle for moving the air blowing opening of the air nozzle along the sunlight reflecting surface, such that a distance of movement of the air nozzle is adjusted.

The air nozzle may have a top end peripheral edge defining an air blowing opening at a top end of the air nozzle, the top end peripheral edge having a curvature or an inclination angle equal or approximate to a curvature or an inclination angle of the reflecting surface on an obverse side of the reflecting surface. With this feature, the top end of the air nozzle can be brought closer to the reflecting surface limitlessly, whereby the blown air can be used effectively for cleaning.

When the reflecting surface is constructed of a parabolic trough having a parabolic cross section, the top end peripheral edge defining the air blowing opening at the top end of the air nozzle may have an arc shape having a curvature equal or approximate to the curvature of the reflecting surface on the obverse side of the reflecting surface to define a gap between the top end peripheral edge of the air nozzle and the reflecting surface, in such a way that the spacing expands gradually as the reflecting surface extends from a widthwise end thereof toward a widthwise center thereof. With this feature, the blown air flows while diffusing toward a wider portion of the spacing, thereby making it easy to blow dust and the like off the reflecting surfaces in a fixed direction.

When the reflecting surface is constructed of a parabolic trough having a parabolic cross section, it is possible that: the top end peripheral edge defining the air blowing opening at the top end of the air nozzle has an arc shape having a curvature equal or approximate to the curvature of the reflecting surface on the obverse side of the reflecting surface, while the air nozzle has a rectangular tubular shape; and a side plate of the air nozzle defining part of the air blowing opening which lies closer to a widthwise center of the reflecting surface is partially cut-out. This feature allows the blown air to pass through the cutout portion, thereby causing the blown air to flow toward the widthwise center of the reflecting surface along the reflecting surface as conformally to the reflecting surface as possible.

The air nozzle may have an internal air passage provided with at least one flow direction adjustor plate for adjusting an air flow direction, the flow direction adjustor plate being configured to be capable of adjusting an inclination angle thereof. With this feature, it is possible to select a direction in which dust can be effectively blown off the reflecting surface and to blow the cleaning air in that direction.

The air nozzle may have a top end peripheral edge removably provided with a brush for cleaning the reflecting surface. This brush is capable of brushing the reflecting surface while functioning as a cushioning member between the air nozzle top end and the reflecting surface.

The cleaning device may further comprise a distance sensor for measuring a spacing between a top end of the air nozzle and the reflecting surface. From the result of measurement by the distance sensor, it is possible to specify a height position of the air nozzle for the purpose of enhancing the cleaning effect.

The cleaning device may further comprise a soiling degree measuring device for measuring a soiling degree of the sunlight reflecting surface, wherein: the soiling degree measuring device includes a light projecting device configured to project a measuring light and a light receiving device configured to receive the measuring light reflected by the sunlight reflecting surface; and the soiling degree measuring device is configured to measure the soiling degree of the sunlight reflecting surface based on a degree of reduction in intensity of the measuring light reflected by the sunlight reflecting surface when compared with intensity of the measuring light projected.

Preferably, the soiling degree measuring device is configured to measure a soiling degree of the sunlight reflecting surface before the sunlight reflecting surface is subjected to the air blowing by the air nozzle and a soiling degree of the sunlight reflecting surface after the sunlight reflecting surface has been subjected to the air blowing, and comparison is made between the two soiling degrees measured to detect an effect of cleaning of the sunlight reflecting surface.

The air supply device may be configured to be capable of adjusting at least one of an air supply amount and an air supply pressure and adjusting at least one of an air blow amount and an air blow pressure based on at least one of a soiling degree measured by the soiling degree measuring device and the cleaning effect detected.

The cleaning device may include a driving device configured to extend and retract the air nozzle in an air blowing direction thereof for moving a top end of the air nozzle toward and away from the sunlight reflecting surface, such that a range of extension and retraction of the air nozzle is adjusted, wherein a spacing between the top end of the air nozzle and the sunlight reflecting surface is adjustable based on at least one of a soiling degree measured by the soiling degree measuring device and the cleaning effect detected.

The cleaning device may include soiling degree measuring devices each located on a respective one of a forward side and a rearward side of the air nozzle in a direction of travel of the truck for measuring a soiling degree of the sunlight reflecting surface, wherein: the soiling degree measuring devices each include a light projecting device configured to project a measuring light and a light receiving device configured to receive the measuring light reflected by the sunlight reflecting surface; the soiling degree measuring devices are each configured to measure the soiling degree of the sunlight reflecting surface based on a degree of reduction in intensity of the measuring light reflected by the sunlight reflecting surface when compared with intensity of the measuring light projected; and the two soiling degree measuring devices measure a soiling degree of the sunlight reflecting surface before the sunlight reflecting surface is subjected to the air blow and a soiling degree of the sunlight reflecting surface after the sunlight reflecting surface has been subjected to the air blow, and comparison is made between the two soiling degrees measured to detect a cleaning effect.

The truck may be configured to be capable of adjusting a traveling speed thereof based on the detected cleaning effect.

The cleaning device may include a driving device configured to extend and retract the air nozzle in an air blowing direction thereof for moving a top end of the air nozzle toward and away from the sunlight reflecting surface, such that a range of extension and retraction of the air nozzle is adjusted, wherein: the air nozzle has a top end peripheral edge removably provided with a brush for cleaning the sunlight reflecting surface; and when a difference between the soiling degree of the sunlight reflecting surface measured by the soiling degree measuring devices on the forward side (before cleaning) and the rearward side (after cleaning) of the air nozzle during the truck traveling is smaller than a predetermined threshold value, the air nozzle is extended to bring the brush into contact with the sunlight reflecting surface for brushing.

It is possible that when a soiling degree resulting from measurement on the sunlight reflecting surface obtained by the soiling degree measuring device on the rearward side of the air nozzle after brushing by the brush is worse than a predetermined soiling degree, the truck makes at least one round-trip movement in a predetermined range of a truck's track to cause the brush to repeat brushing.

The cleaning device may include a travel distance measuring device for measuring a distance of travel of the truck, wherein: a location of the sunlight reflecting surface arranged along the truck's track is specified based on the distance of travel of the truck measured by the travel distance measuring device; and when the sunlight reflecting surface has a soiling degree worse than the predetermined soiling degree after repeated brushing, the location of the sunlight reflecting surface is recorded. This feature allows the reflecting surface at the location of concern to be cleaned by a different method other than the cleaning method by this cleaning device.

The cleaning device may include, as one component thereof, a vibrating device provided on the sunlight collecting device for vibrating the sunlight collecting device.

The truck may be provided with a camera for taking a photograph of the sunlight reflecting surface after cleaning. By carefully observing the photograph taken of the sunlight reflecting surface, the condition of the sunlight reflecting surface can be checked easily and with precision.

The cleaning device may include a travel guide device for guiding travel of the truck to allow the truck to travel along the sunlight collecting devices arranged in a line. This feature makes it possible to keep constant the spacing between the air nozzle mounted on the truck and each of the reflecting surfaces to be cleaned.

It is possible that: the travel guide device may include a guided member provided on the truck and a guiding rail engaging with the guided member for guiding the guided member; when the sunlight reflecting surfaces of the sunlight collecting devices are arranged in plural lines parallel with each other, the guiding rail comprises a plurality of parallel guiding rails each extending along a respective one of the lines of the sunlight reflecting surfaces, while slide plates each fitted with extension rail portions of all the guiding rails are provided at opposite ends of all the guiding rails outwardly of the lines of the sunlight reflecting surfaces, the slide plates being slidable along the ground in a direction perpendicular to a longitudinal direction of the guiding rails. This feature allows the truck to move to an adjacent one of the guiding rails sequentially, thus making it possible to smoothly clean a line of sunlight reflecting surfaces that have not been cleaned yet.

Advantage of the Invention

According to the present invention, the reflecting surfaces of the collectors can be cleaned by using air, which is inexhaustible in any region and, hence, a limitation by reason of cleaning equipment does not exist when selecting a place for installing a solar thermal electric power generation system. Further, there is no need to consume large amounts of water, which is valuable in a desert or the like. The cleaning device has a simplified structure since the cleaning device is an air blowing device.

The foregoing and further contents of the present invention will become apparent from the following detailed description made with reference to the drawings.

BEST MODE FOR CARRYING OUT THE INVENTION

Embodiments of a cleaning device for a solar thermal electric power generation system according to the present invention will be described with reference to the attached drawings.

Figure 11:
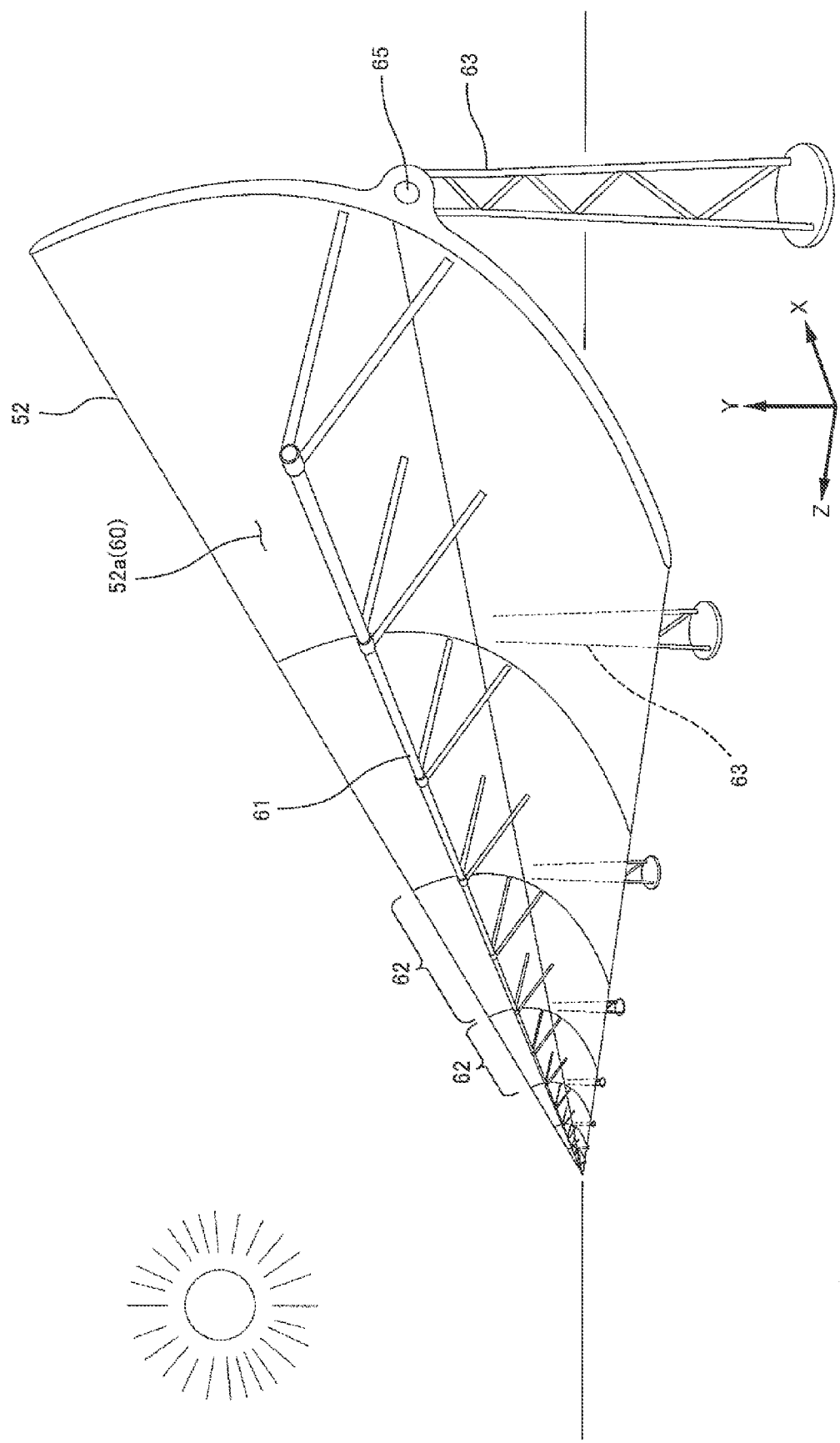
FIG. 11 is a perspective view showing a parabolic trough type collector unit used in the solar thermal electric power generation system shown in FIG. 10.

FIG. 11 shows a single parabolic trough type collector 52. The collector 52 shown in FIG. 11 has a reflecting surface 52a in a substantially horizontal orientation to the sun. The expression "orientation of the reflecting surface 52a", as used herein, means an orientation of the normal to the reflecting surface 52a. The single collector (sunlight collecting device) 52 illustrated here is a unit having a total length of about 150 m which is assembled by joining twelve modules 62 each having an opening width of about 5.8 m and a length of about 12 m. Of course, these sizes are illustrative and are not limitative. The sizes are illustrated for understanding of a typical size of such a collector unit. FIGS. 5 to 8 are each a view showing a cleaning device 1 as viewed from a reverse side of the cleaning device shown in FIG. 1 in the forward and rearward directions, that is, as viewed in a direction indicated by arrows on line V-V of FIG. 1.

Each of the modules 62 is turnably supported on support pillars 63 at its opposite ends. The support pillars 63 are each fixed to a concrete foundation by means of anchor bolts or the like. Incidentally, in a solar thermal electric power generation system of a 30 MW output class, more than 200 units each having the aforementioned length of 150 m are arranged, namely with heat absorbing tubes extending more than 3 km in total. The cleaning device 1 illustrated here is a device for cleaning the reflecting surfaces 52a of such long collectors 52 arranged in multiple lines by air blowing while traveling along each line of collectors 52.

Figure 1A:
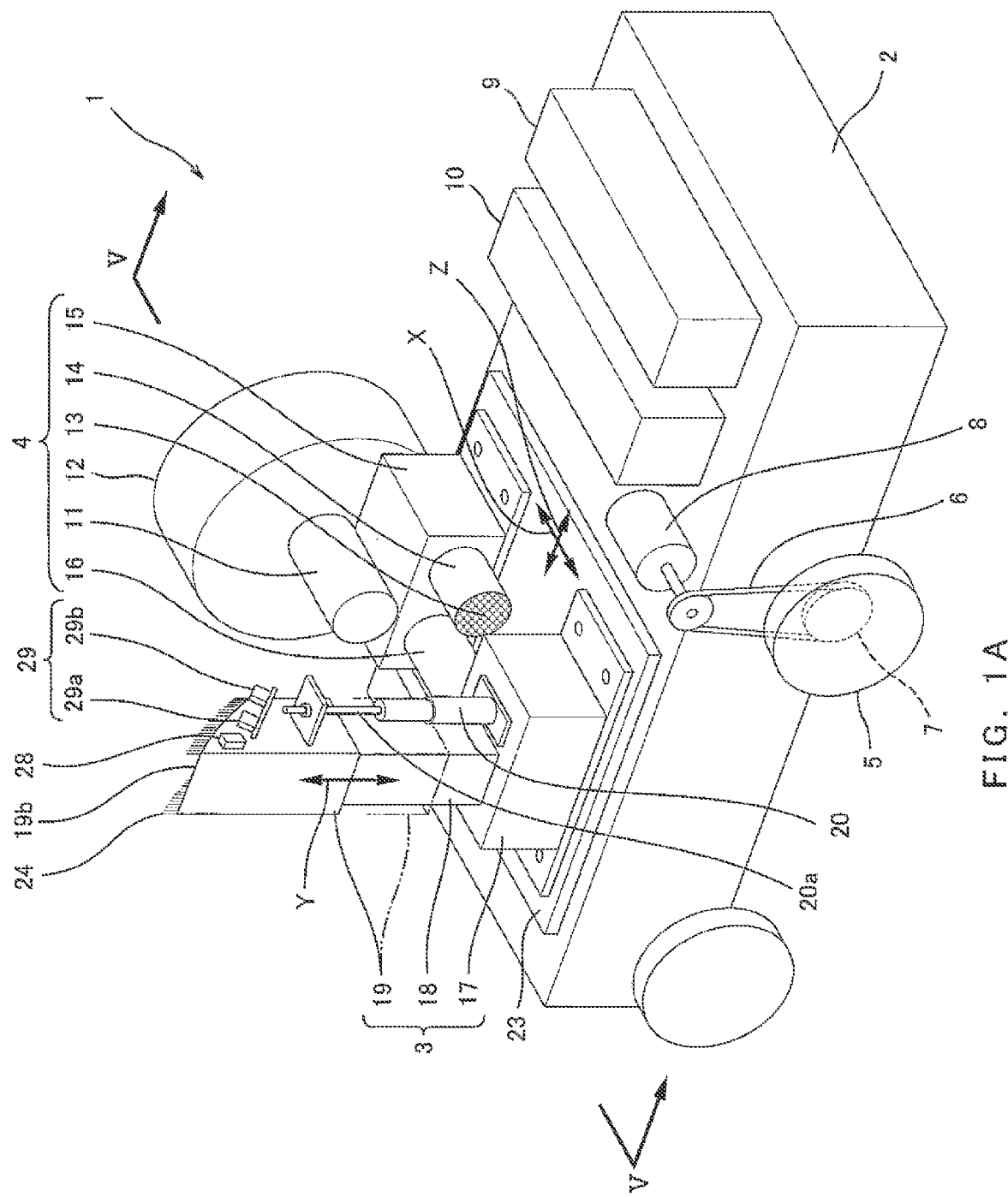
FIG. 1A is a perspective view showing one embodiment of a cleaning device according to the present invention.

FIG. 1A shows one embodiment of a cleaning device according to the present invention. The cleaning device 1 includes an air blow device 3 for blowing air, an air supply device 4 for supplying the air blow device 3 with air, and the like, which are mounted on a self-propelled truck 2. The truck 2, which is of the self-propelled type, has wheels 5 and a travel driving device 8 for rotating the wheels 5 by way of chains 6 and sprockets 7. Of course, the truck 2 is not limited to the self-propelled type but may be of the type pulled by any traction device. Though the present embodiment uses an electric motor as the travel driving device 8, it is possible to use an internal combustion engine, a hydraulic device, or the like.

A blower 12 driven by a rotation driving device 11 is employed as the air supply device 4. There is no limitation on the type of the blower. Though an electric motor is used as the rotation driving device 11, an internal combustion engine may be used without limitation to such an electric motor. The blower 12 sucks air thereinto through an air intake hole 14 provided with a filter 13 and supplies air to the air blow device 3 with pressure through an air chamber 15 and an air exhaust passage 16.

The air blow device 3 includes an air chamber 17, an air supply tube 18 standing on the air chamber 17, and an air nozzle 19 vertically slidably fitted in an upper portion of the air supply tube 18. The sliding interface between the air supply tube 18 and the air nozzle 19 is provided with a suitable seal (not shown). Though the air supply tube 18 and the air nozzle 19 employed in the present embodiment both have rectangular tubular shapes, there is no limitation to such shapes. An elevation driving device 20 stands on the air chamber 17 for moving the air nozzle 19 up and down. Though the elevation driving device 20 is provided only on the forward side of the air nozzle 19, it is possible to provide such an elevation driving device either on the rearward side of the air nozzle 19 only or on each of the forward side and the rearward sides. The "forward", as used herein, means the direction of travel of the truck 2 and the "rearward", as used herein, means 180 degrees opposite direction to the "forward". Though the present embodiment employs an electrically-operated cylinder as the elevation driving device 20, it is possible to employ a hydraulic cylinder or the like.

Figure 1B:
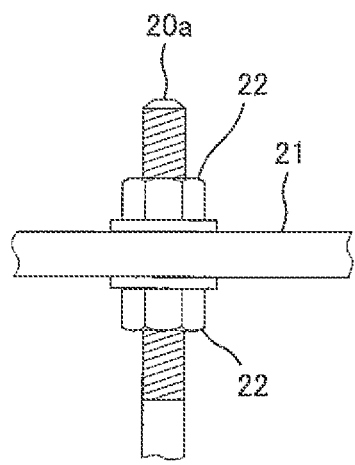
FIG. 1B is a front elevational view showing a top portion of a cylinder rod shown in FIG. 1A in detail.

As shown in FIG. 1B, a near-top end portion of a cylinder rod 20a is connected to a mounting bracket 21 protruding from a side plate of the air nozzle 19 for positional adjustment. Specifically, the near-top end portion of the cylinder rod 20a formed with external thread extends through a through-hole of the mounting bracket 21, and a pair of nuts 22 threadingly engaging with the near-top end portion fix the mounting bracket 21 by clamping the bracket 21 therebetween. With the nuts 22 loosened, the position of the mounting bracket 21 relative to the cylinder rod 20a can be changed so as to adjust the height position of the air nozzle 19.

Since the travel driving device 8 of the truck 2, rotation driving device 11 for the blower 12 and elevation driving device 20 for the air nozzle 19, which are employed in the present embodiment, are all electrically-operated devices as described above, the truck 2 carries thereon an electric power generating device 9 serving for these electrically-operated devices 8, 11 and 20. The electric power source may be direct current or alternating current. Since the present embodiment employs a direct current power source, a battery 10 is also provided.

As shown in FIG. 1A, the air blow device 3 and the air supply device 4 are mounted on a common base plate 23. The common base plate 23 is mounted on a top surface of the truck 2 so as to be horizontally movable in directions (X-directions) perpendicular to the directions of travel of the truck 2 (Z-directions). Here, Y-directions mean vertical directions. Thus, the positions of the air blow device 3 and the air supply device 4 relative to the truck 2 can be adjusted. Any kind of known mechanism, such as a feed screw mechanism, can be employed as a non-illustrated driving mechanism for moving the common base plate 23. By moving the truck 2 forward and backward, moving the air nozzle 19 up and down and moving horizontally the common base plate 23, the air nozzle 19 can move along the three axes, i.e., X-, Y-, and Z-axes. The directions of horizontal movement of the common base plate 23 are not limited to the aforementioned X-directions. The common base plate 23 may be configured to be movable in the directions of travel of the truck 2 (Z-directions) also. It is possible to provide a non-illustrated antivibration device between the common base plate 23 and the top surface of the truck 2.

Figure 5:
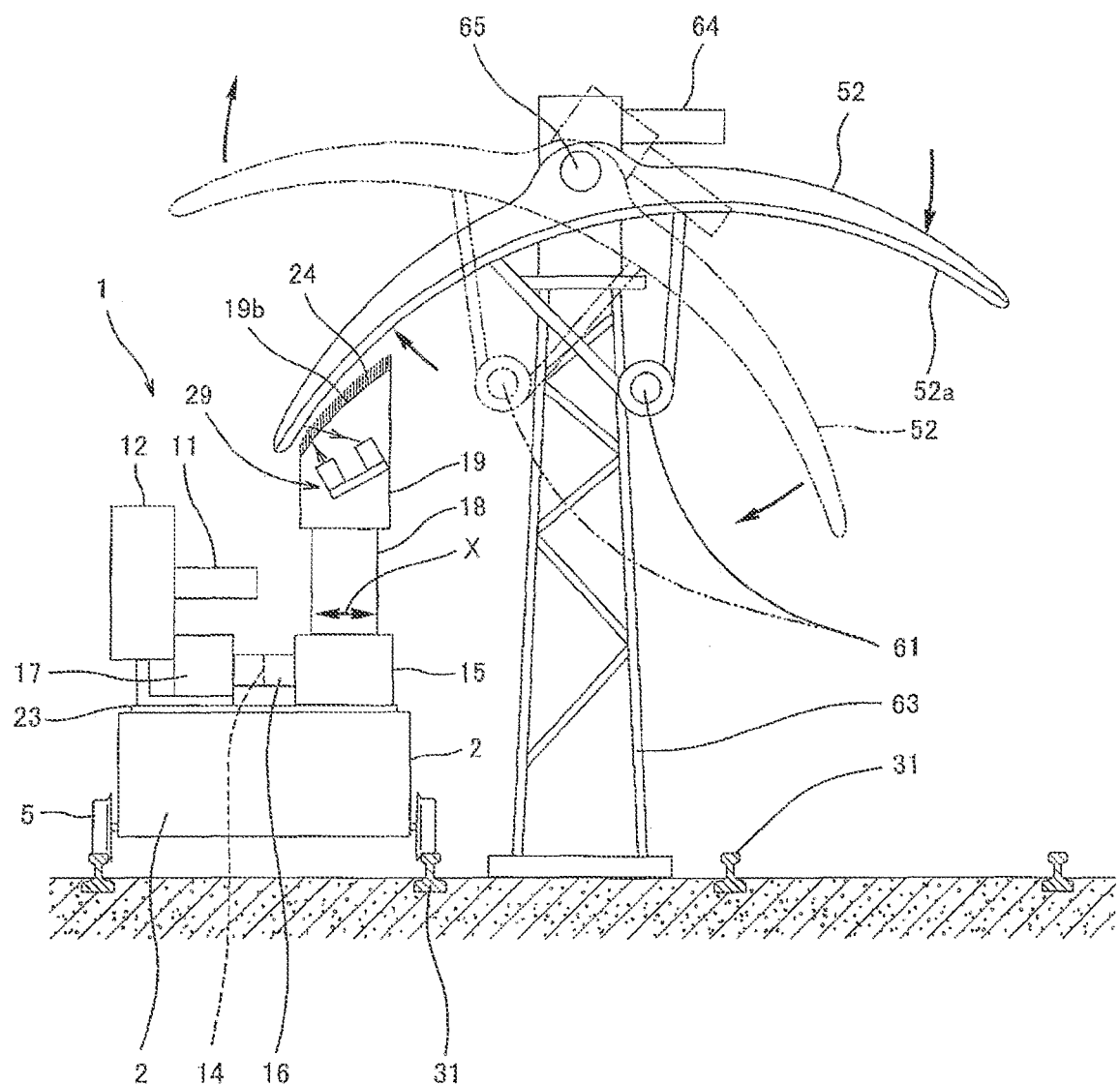
FIG. 5 is a back elevational view, as viewed in a direction indicated by arrows on line V-V of FIG. 1, of the cleaning device of FIG. 1 in one exemplary state of cleaning a collector.

As shown in FIGS. 1A and 5, a top end peripheral edge of the air nozzle 19 defining an air blowing opening of the air nozzle 19 has an arc shape having a curvature equal or approximate to that of the reflecting surface 52a of the collector 52. As shown in FIG. 5, a portion of the top end of the air nozzle 19 which is oriented outwardly of the truck is made higher than a portion of the top end which is oriented inwardly of the truck. With this configuration, the top end of the air nozzle 19 can be limitlessly brought closer to the reflecting surface 52a oriented in a predetermined direction (substantially downward). Further, the top end peripheral edge 19b is configured to define a gap between 19b and 52a with the reflecting surface 52a which expands gradually as the reflecting surface 52a extends from a widthwise end thereof toward a widthwise center thereof when the top end peripheral edge 19b is brought close to the reflecting surface 52a oriented substantially downwardly. The purpose of this feature is to cause the air blowing from the air nozzle 19 to flow along the reflecting surface toward the center of the reflecting surface 52a as conformally to the reflecting surface 52a as possible. Though the top end peripheral edge 19b may have a linear shape inclined relative to a vertical line, the top end peripheral edge 19b more preferably has the aforementioned arc shape from the viewpoints of its approach to the reflecting surface 52a and adjustment of the spacing with the reflecting surface.

As shown, a brush 24 is removably provided along the top end peripheral edge 19b. The brush 24 serves to brush the reflecting surface 52a of the collector 52 and, hence, the material, hardness, density, length, top end shape and the like of the brush 24 are optimum ones selected in view of the material of the reflecting surface 52a, condition of dust deposit, and the like. The brush 24 also functions as a cushioning member between the reflecting surface 52a and the air nozzle 19. A higher portion of the top end peripheral edge 19b which is oriented outwardly of the truck is free of the brush 24. The purpose of this feature is to allow the air blown from the air nozzle 19 to pass through the brush-free portion, thereby causing the blown air to flow along the reflecting surface toward the widthwise center of the reflecting surface 52a as conformally to the reflecting surface 52a as possible.

Figure 2:
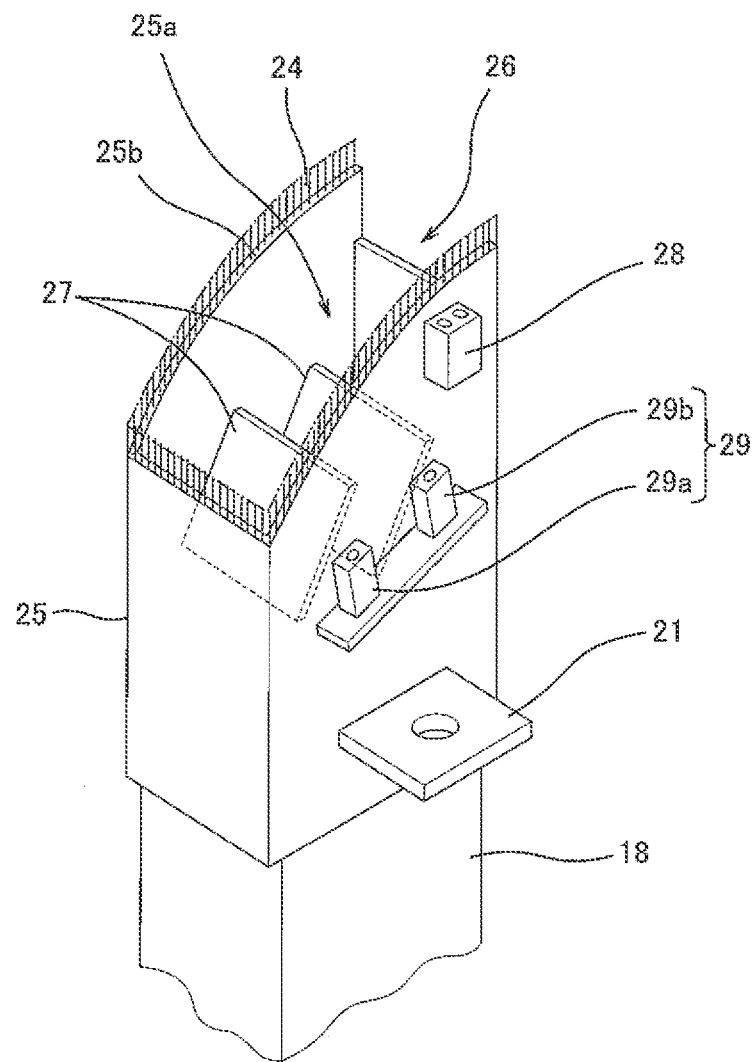
FIG. 2 is a perspective view showing another example of an air nozzle used in the cleaning device shown in FIG. 1.

FIG. 2 shows another air nozzle 25. The air nozzle 25 has a top end peripheral edge 25b defining an air blowing opening 25a. The top end peripheral edge 25b has an arc shape having a curvature equal or approximate to that of the reflecting surface 52a while being configured to define a gap between 25b and 52a with the reflecting surface 52a which is constant as the reflecting surface 52a extends toward the widthwise center thereof. A side plate of the top end of the air nozzle 25 which lies closer to the widthwise center of the reflecting surface 52a is partially cut-out. The purpose of this feature is to allow the air blown from the air nozzle 19 to pass through the cutout portion 26, thereby causing the blown air to flow toward the widthwise center of the reflecting surface 52a as conformally to the reflecting surface 52a as possible. As shown, an internal air passage of the air nozzle 25 is provided with at least one flow direction adjustor plate (i.e., louver) 27 which is inclined toward the widthwise center of the reflecting surface 52a for causing the air to be blown out in that direction. Though not shown, it is possible that the louver 27 is rotatably supported on an internal plate of the air nozzle 25 so that the inclination angle of the louver 27 is made adjustable by rotating the louver 27 by means of a motor or the like connected to its rotating shaft.

Figure 3:
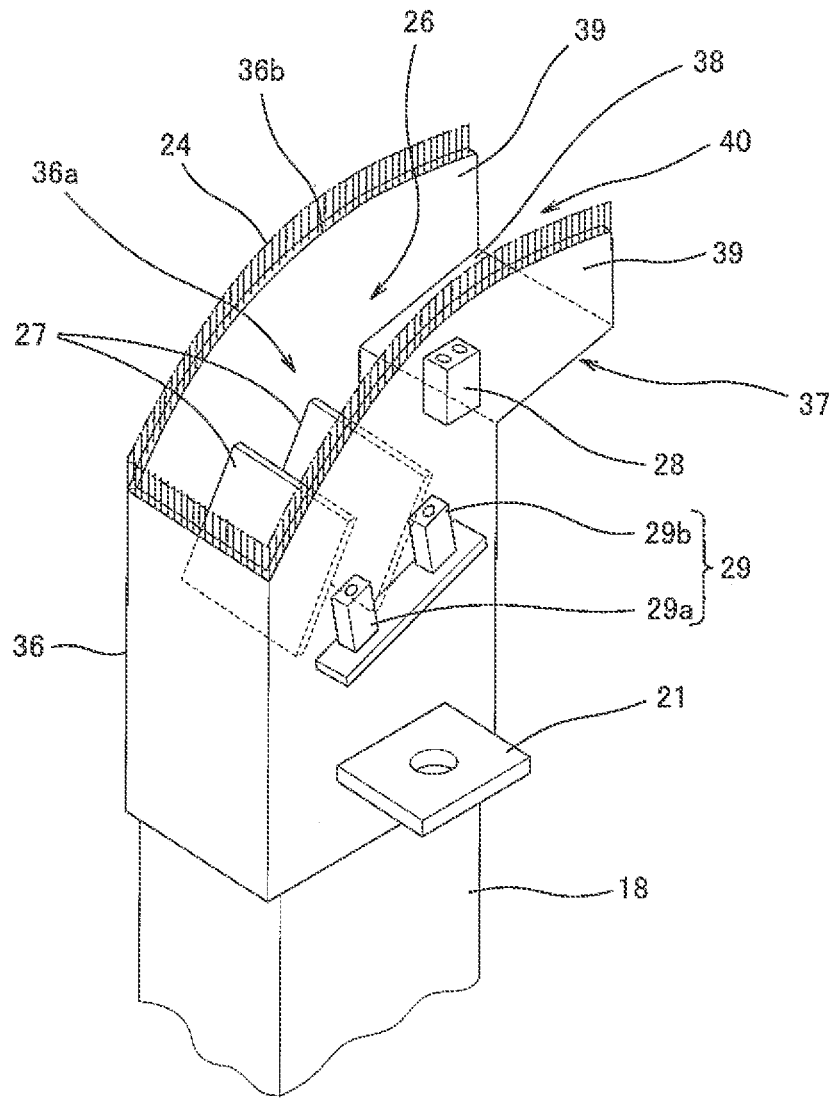
FIG. 3 is a perspective view showing yet another example of an air nozzle used in the cleaning device shown in FIG. 1.

FIG. 3 shows yet another air nozzle 36. The air nozzle 36 is formed with an extension portion 37 projecting outwardly from the cutout portion 26 of the air nozzle 25 shown in FIG. 2. Since the air nozzle 36 shown in FIG. 3 and the air nozzle 25 shown in FIG. 2 are similar to each other in other shapes and structures, like reference characters designate like members and like parts in order to omit detailed descriptions thereof. The extension portion 37 comprises a bottom plate portion 38 extending outwardly from a lower end edge of the cutout portion 26 and side plate portions 39 erected upwardly from opposite side edges of the bottom plate 38. An entire top end peripheral edge 36b including upper end edges of the side plate portions 39 has an arc shape having a curvature equal or approximate to that of the reflecting surface 52a while being configured to define a gap between 36b and 52a with the reflecting surface 52a which is constant as the reflecting surface 52a extends toward the widthwise center thereof. The extremity of the extension portion 37 defines an opening 40 allowing the air blown from the air nozzle 36 to pass therethrough. Since the top end peripheral edge 36b of the air nozzle 36 is longer than that of the air nozzle 25 shown in FIG. 2, the brush 24 is capable of brushing a broader widthwise range of the reflecting surface 52a. Further, since the top end peripheral edge 36b defines an air blowing opening 36a having an increased length in the width direction of the reflecting surface 52a and therefore the length of a blown air flow passage along the reflecting surface 52a is increased, the effect of removing dust and the like by air blowing can be expected to enhance.

Figure 4:
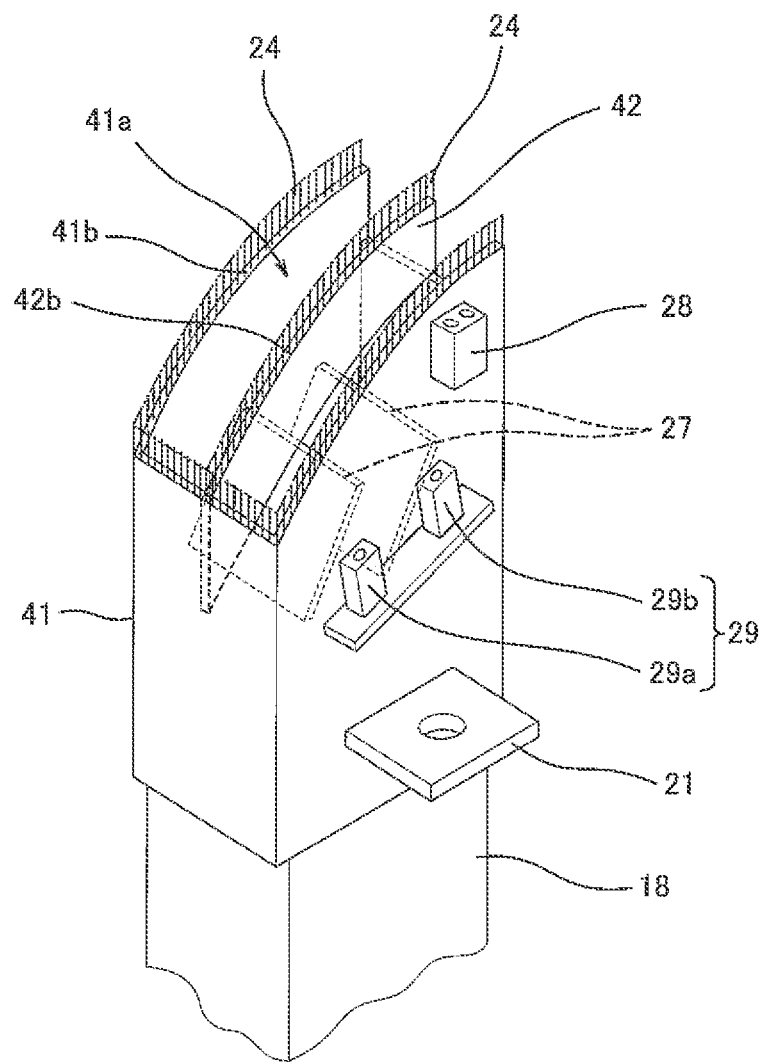
FIG. 4 is a perspective view showing yet another example of an air nozzle used in the cleaning device shown in FIG. 1.

FIG. 4 shows yet another air nozzle 41. The air nozzle 41 has a brush plate 42 bridging over a central portion of the air blowing opening 25a of the air nozzle 25 shown in FIG. 2. Since the air nozzle 41 and the air nozzle 25 shown in FIG. 2 are similar to each other in other shapes and structures, like reference characters designate like members and like parts in order to omit detailed descriptions thereof. The brush plate 42 has an upper end edge 42a at the same height as a top end peripheral edge 41b of the air nozzle 41. The top end peripheral edge 41b, as well as the upper end edge 42a, has an arc shape having a curvature equal or approximate to that of the reflecting surface 52a while being configured to define a gap between 41b and 52a with the reflecting surface 52a which is constant as the reflecting surface 52a extends toward the widthwise center thereof. The brush 24 is removably provided on the upper end edge 42a of the brush plate 42. The number of such brush plates 42 is not limited to one, but may be two or more. Preferably, an air blowing opening 41a of the air nozzle 41 is divided equally by the brush plate 42. The air nozzle 36 shown in FIG. 3 may be provided with a brush plate having the same length as its top end peripheral edge 36b.

Though not shown, the cleaning device may be provided with a second air nozzle served by a second blower for removing dust and the like that have been blown toward the widthwise center of the reflecting surface 52a by any one of the foregoing air nozzles 19, 25, 36 and 41 (hereinafter will be represented by reference numeral 19) further outwardly (for example, out of the area of the collector 52).

As shown in FIGS. 1A to 5, the air nozzle 19 is provided with a distance sensor 28. There is no limitation on the type of the distance sensor, and any known sensor can be employed such as an ultrasonic distance sensor configured to measure a distance based on the detecting time of a reflected sonic wave. The distance sensor 28 is provided for measuring the distance between the top end peripheral edge 19b of the air nozzle and the reflecting surface 52a.

The air nozzle 19 has a forward exterior surface and a rearward exterior surface which are each provided with one or more soiling degree measuring devices 29 for measuring the soiling degree of the reflecting surface 52a to be cleaned. The present embodiment employs, as the soiling degree measuring device 29, an illuminometer having a light projecting device 29a and a light receiving device 29b. The light projecting device 29a projects a measuring light toward the reflecting surface 52a, while the light receiving device 29b receives the measuring light reflected by the reflecting surface 52a. The soiling degree of the reflecting surface 52a is determined from a difference in intensity between the measuring light projected and the reflected light received, that is, from a degree of reduction in intensity of reflected light detected by the light receiving device 29b. The soiling degree measuring device 29 on the forward side of the air nozzle 19 measures the soiling degree of the reflecting surface 52a before the reflecting surface 52a is subjected to an air blow, and then the soiling degree measuring device 29 on the rearward side of the air nozzle 19 measures the soiling degree of the reflecting surface 52a after the reflecting surface 52a has been subjected to the air blow. By comparison between the soiling degree before cleaning and that of after cleaning measured by the respective soiling degree measuring devices 29 on the forward side and the rearward side of the air nozzle 19, a cleaning effect by the air blow is detected.

The truck 2 is provided with a travel distance measuring device (not shown). As the travel distance measuring device, a pulse generator may be provided for example on the shaft of an electric motor serving as the travel driving device 8 or on the axle of the wheels 5. Such a device records one by one distances of travel of the truck 2 from a base position on the track, thereby specifying the position of the truck 2 on the track extending along collectors 52 installed in the solar field 51 (see FIGS. 9 and 10).

As shown in FIG. 5, a rail 31 which forms a part of a travel guide device is laid along a line of collectors 52 so as to allow the truck 2 to travel along the collectors 52 keeping a spacing constant between the truck 2 and the collector 52. Flanged steel wheels 5 are employed for the truck 2 to travel on rails 31.

Figure 6:
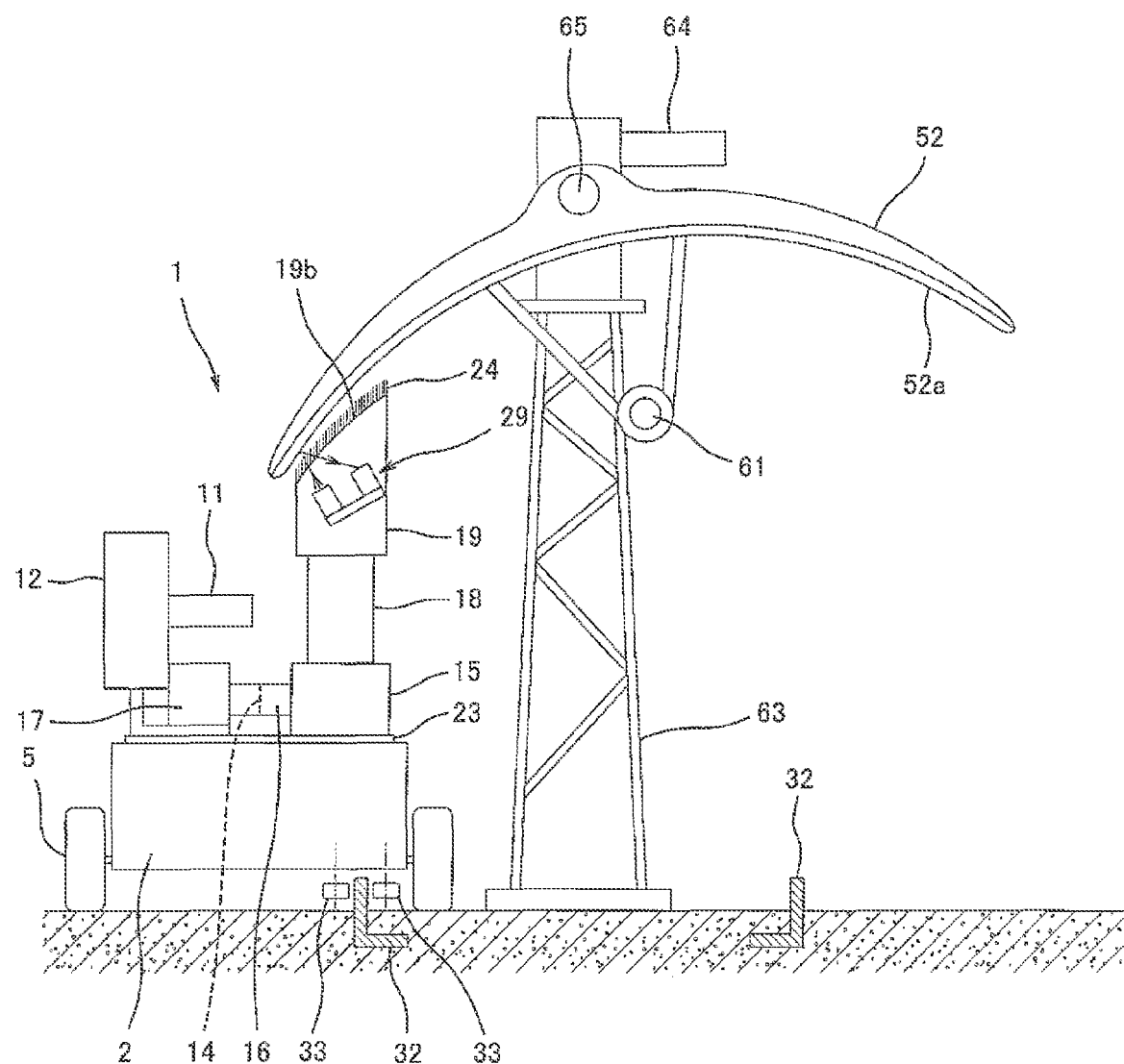
FIG. 6 is a back elevational view, as viewed in the direction indicated by arrows on line V-V of FIG. 1, of the cleaning device of FIG. 1 in another exemplary state of cleaning a collector.

Instead of such a wheel for railway car, a wheel fitted with a tire may be used. In this case, the track for travel of the truck 2 is preferably made flat. More preferably, the track is paved with concrete or asphalt. Further, a guide rail 32 is laid along a line of collectors 52 so as to project upwardly from the track surface, as shown in FIG. 6. Angle steel or the like can be employed as the guide rail 32. On the other hand, the truck 2 is provided with plural pairs of guide rollers 33 which are spaced apart from each other in the forward and rearward directions thereof. The guide rail 32 and the guide rollers 33 form the travel guide device for the truck 2. Each pair of rollers 33 are positioned so as to be capable of sandwiching the guide rail 32 therebetween. This feature allows the truck 2 to travel along the collectors 52 keeping the spacing constant between the truck 2 and the collector 52.

Figure 7:
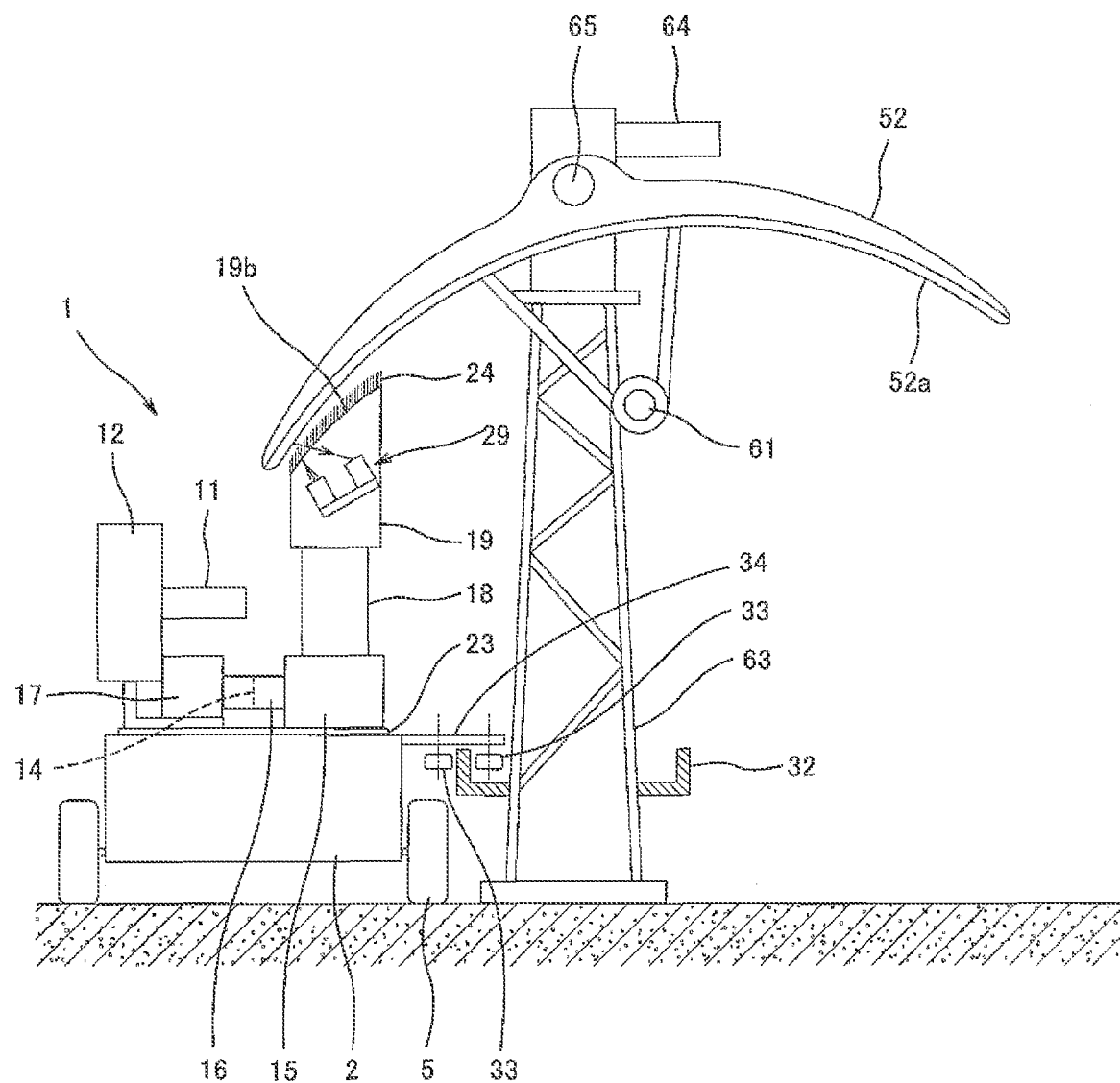
FIG. 7 is a back elevational view, as viewed in the direction indicated by arrows on line V-V of FIG. 1, of the cleaning device of FIG. 1 in yet another exemplary state of cleaning a collector.

FIG. 7 shows another guide mechanism. The truck 2 is provided with wheels that are each fitted with a tire so as to be capable of traveling on a paved road. The support pillars 63 of the collectors 52 are fitted with a guide rail 32 similar to that shown in FIG. 6 at a fixed height from the ground surface. Angle steel or the like can also be employed as the guide rail 32. The truck 2 is provided with a support bracket 34 protruding toward the collector 52 side, and the support bracket 34 is provided with plural pairs of guide rollers 33 which are spaced apart from each other in the forward and rearward directions, like the guide rollers shown in FIG. 6. Each pair of guide rollers 33 are positioned so as to be capable of sandwiching the guide rail 32 therebetween. This feature allows the truck 2 to travel along the collectors 52 keeping the spacing constant between the truck 2 and the collector 52.

Figure 8A:
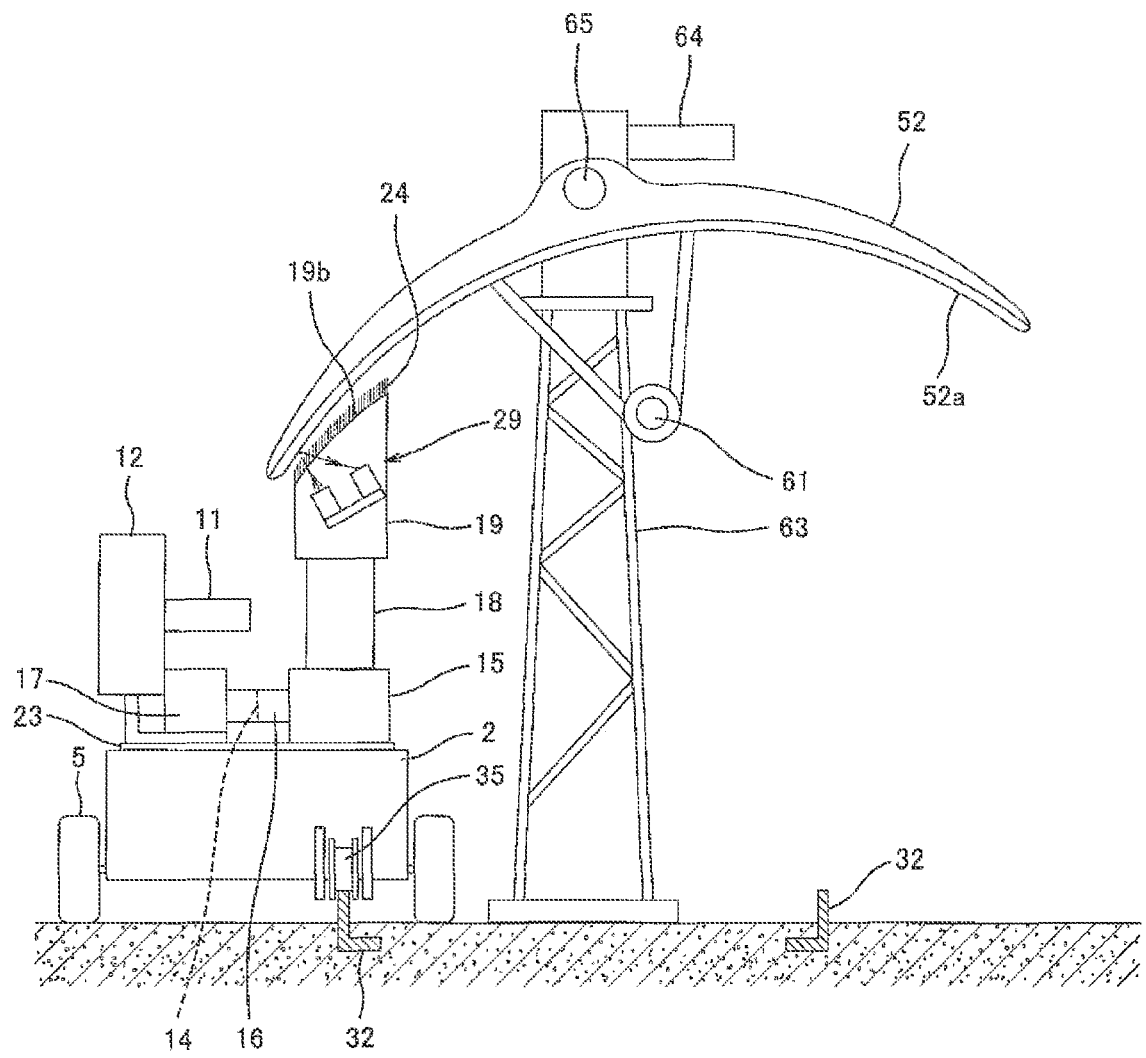
FIG. 8A is a back elevational view (as viewed in the direction indicated by arrows on line V-V of FIG. 1) of the cleaning device of FIG. 1 in yet another exemplary state of cleaning a collector.
Figure 8B:
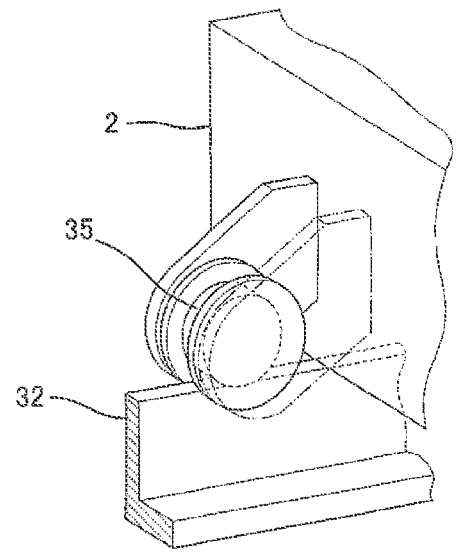
FIG. 8B is a perspective view showing a guide wheel portion of the cleaning device shown in FIG. 8A.

FIG. 8A shows yet another guide mechanism. The truck 2 is provided with wheels each fitted with a tire so as to be capable of traveling on a paved road. Further, the guide rail 32 similar to that shown in FIG. 6 is laid along a line of collectors 52 so as to project upwardly from the road surface. Angle steel or the like can also be employed as the guide rail 32. The truck 2 has a forward end portion and a rearward end portion at least one of which (desirably both of which) is provided with a guide wheel 35 formed with flanges on both ends thereof (see FIG. 8B). Each guide wheel 35 engages with the guide rail 32 for rolling. This feature allows the truck 2 to travel along the collectors 52 keeping the spacing constant between the truck 2 and the collector 52.

Though not shown, the truck 2 carries thereon a control device configured to control the cleaning operation of the cleaning device 1. The control device is capable of automatically performing a series of programmed operations. Alternatively, it is possible to provide a control center of the electric power generation system with such a control device and to provide the truck with a receiving device, for the cleaning operation to be controlled remotely from the control center.

FIGS. 5 to 8A each show the cleaning device 1 in a state of cleaning the reflective surface 52a. The collector 52 is capable of rotating about its rotating shaft 65 by a driving device 64. The range of rotation (i.e., angle of rotation) is such as not to allow the heat absorbing tube 61 to contact the collector support pillars 63 and is usually not less than 300 degrees (see the collector 52 depicted by dashed double-dotted line in FIG. 5). The position of the reflecting surface 52a is adjusted by signals or the like transmitted from a sun tracking control device (not shown) during operation in the daytime. Before cleaning, the collector 52 is rotated so that its reflecting surface 52a is oriented most downward and then stopped. The "most downward", as used herein, indicates a position in which the collector 52 is oriented most downward within the range that does not allow the heat absorbing tube 61 to contact the collector support pillars 63. This position is a predetermined maintenance position. The maintenance position is thus set not only because maintenance operations including cleaning by the air nozzle 19 are easy but also because removed dust and the like are difficult to deposit on the reflecting surface 52a during cleaning. When the collector 52 is in the maintenance position, the truck 2 and the heat absorbing tube 61 are positioned on opposite sides of the collector support pillars 63.

Vibrating devices (not shown) may be provided on the reverse side of the collectors 52. By vibrating the collectors 52 during air blowing, the cleaning effect can be enhanced.

Further, it can be expected that dust and the like that have been blown off once are prevented from depositing again on the reflecting surface 52a.

When cleaning procedures start, the position of the air nozzle 19 is adjusted by moving the common base plate 23 in the X-direction (see FIG. 5) so that the left end of the air nozzle 19 is positioned to coincide with the left end of the collector's reflecting surface 52a or slightly to the right (i.e., toward the widthwise center of the collector) from that position, as viewed in the direction of the truck traveling. Further, the air nozzle 19 is elevated by the elevation driving device 20 to come closer to the reflecting surface 52 so that the gap between the top end of the air nozzle 19 and the reflecting surface 52a has a proper value (or the left end of the brush 24 slightly contacts the reflecting surface 52a when the brush 24 is provided on the air nozzle 19). A maximum stroke of the elevation driving device 20 is set to coincide with this position. Alternatively, in cases where the maximum stroke of the elevation driving device 20 is not adjusted, the pair of nuts 22 (see FIG. 1B) are loosened to adjust the position of the air nozzle 19 relative to the reflecting surface 52a at the maximum stroke of the elevation driving device 20. When all the initial settings including setting of the travel start position of the truck 2 (i.e., base position S in FIG. 9) are completed, the air nozzle 19 is allowed to blow air in order to perform cleaning of the reflecting surface, while the truck 2 is caused to travel at a constant speed for example.

During air blowing by the air nozzle 19 with the truck 2 traveling, the soiling degree measuring devices 29 on both of the forward side and the rearward side of the air nozzle 19 continuously detect the cleaning effect (i.e., the degree of increase in the reflection efficiency of the reflecting surface 52a caused by air blowing). When quantification of the cleaning effect becomes possible after lapse of a certain operation period, the result of air blow cleaning can be evaluated through quantification based on measured data accumulated. To be described below is an exemplary evaluation of the cleaning effect and an exemplary remedy therefor.

The control device has stored therein reference values of soiling degrees (Description has already been made of the soiling degree itself.) At least one of an allowable value of soiling degree itself (a first reference value) and an allowable reduction ratio or allowable reduction value (a second reference value) which is a change in soiling degrees before air blowing and after air blowing, may be employed as the reference value. When a value measured by the soiling degree measuring device 29 on the rearward side of the air nozzle 19, i.e., a measured value of soiling degree of the reflecting surface 52a obtained after air blowing, is bigger than the first reference value, the control device sends operation instruction signals, described later, to the devices on the truck 2. When a value measured by the soiling degree measuring device 29 on the forward side of the air nozzle 19, i.e., a measured value of soiling degree of the reflecting surface 52a obtained before air blowing, is lower than the first reference value, cleaning is judged as being unnecessary and air blowing may be stopped. When the difference between values measured by the soiling degree measuring devices 29 on the forward side and the rearward side of the air nozzle 19, i.e., the degree of reduction in soiling degree by air blowing, is lower than the second reference value, the control device sends operation instruction signals, described later, to the devices on the truck 2.

When the measured value is bigger than the first reference value, and/or the difference between the measured values is smaller than the second reference value, the control device instructs, for example, the air supply device 4 to increase the air blow amount and/or the air blow pressure. Specifically, the rotation driving device 11 is caused to increase revolutions. With this configuration, the effect of removing dust and the like on the reflecting surface 52a can be enhanced. Alternatively, the control device may instruct the travel driving device 8 to lower the traveling speed of the truck 2. With this configuration, the time period for which the same portion of the reflecting surface 52a is subjected to air blowing is lengthened, thereby the effect of removing dust and the like on the reflecting surface 52a can be improved. Yet alternatively, the control device instructs the elevation driving device 20 to adjust the height position of the air nozzle 19 thereby adjusting the spacing between the reflecting surface 52a and the air nozzle 19. That is, the control device performs a feedback control to optimize the spacing based on a measured value obtained by the soiling degree measuring device 29 on the rearward side of the air nozzle 19. Yet alternatively, the control device gives an instruction to change the air blow direction by adjusting the inclination angle of the louver 27. Then, the control device performs a feedback control to optimize the inclination angle based on a measured value obtained by the soiling degree measuring device 29 on the rearward side of the air nozzle 19. The above-described four controls (control of air blowing, control of the traveling speed, control of the spacing, and control of the angle of the louver 27) may be performed either alone or in effective combination of two or more of them for simultaneous controls.

In cases where neither the first reference value nor the second reference value is satisfied even by the aforementioned four controls, or where the first reference value is not satisfied and a difference is not obtained between the values measured by the soiling degree measuring devices 19 on the forward side and the rearward side of the air nozzle 19 (in such cases a third reference value may be additionally established), brushing operation may be performed. In a specific example, the control device instructs the elevation driving device 20 to elevate the air nozzle 19 by a predetermined distance in order to press the brush 24 against the reflecting surface 52a. Subsequently, the air nozzle 19 on the common base plate 23 is caused to reciprocate in the forward and rearward directions of the truck traveling (i.e., Z-direction). Desirably, the common base plate 23 is also caused to reciprocate in the width directions of the reflecting surface 52a (i.e., X-direction) at the same time with Z-direction reciprocations of the air nozzle(s) 19. Synchronously with reciprocations in the X-direction, the air nozzle 19 is caused to move up and down so that the relative spacing between the top end of the air nozzle 19 and the reflecting surface 52a is kept constant. Instead of or in addition to the reciprocations of the common base plate 23 in the forward and rearward directions (i.e., Z-directions), the truck 2 may be caused to reciprocate in order to repeat brushing operation. During such brushing operation, the traveling speed of the truck 2 may be lowered substantially. In order to confirm the brushing effect by means of the soiling degree measuring devices 29, the truck 2 may be caused to move back (or reciprocate).

In cases where there remains a portion that cannot satisfy the reference values even after having been subjected to the above-described cleaning operation, the control device stores therein information on the portion of concern of the reflecting surface 52a, i.e., the position of concern on the reflecting surface 52a along the traveling track of the truck 2. Such positional information can be stored easily because any position can be specified from the record of measurements by the traveling distance measuring device mounted on the truck 2. Preferably, an alarm signal indicative of the presence of an unusually soiled portion is sent to the control center or the like while the portion of concern is displayed thereat, after all the cleaning operations have been completed. Thereafter, confirmation is made about the portion of concern and of deposition of dust and the like so as to execute a separate cleaning operation.

Alternatively, a camera (not shown) may be mounted on the truck 2 to take a photograph of the unusually soiled portion at the position of concern. By carefully observing an image processed or the like of data thus obtained, the soiling condition over the entire length of the collectors 52 can be checked easily and precisely during the resting period in the nighttime.

Figure 9:
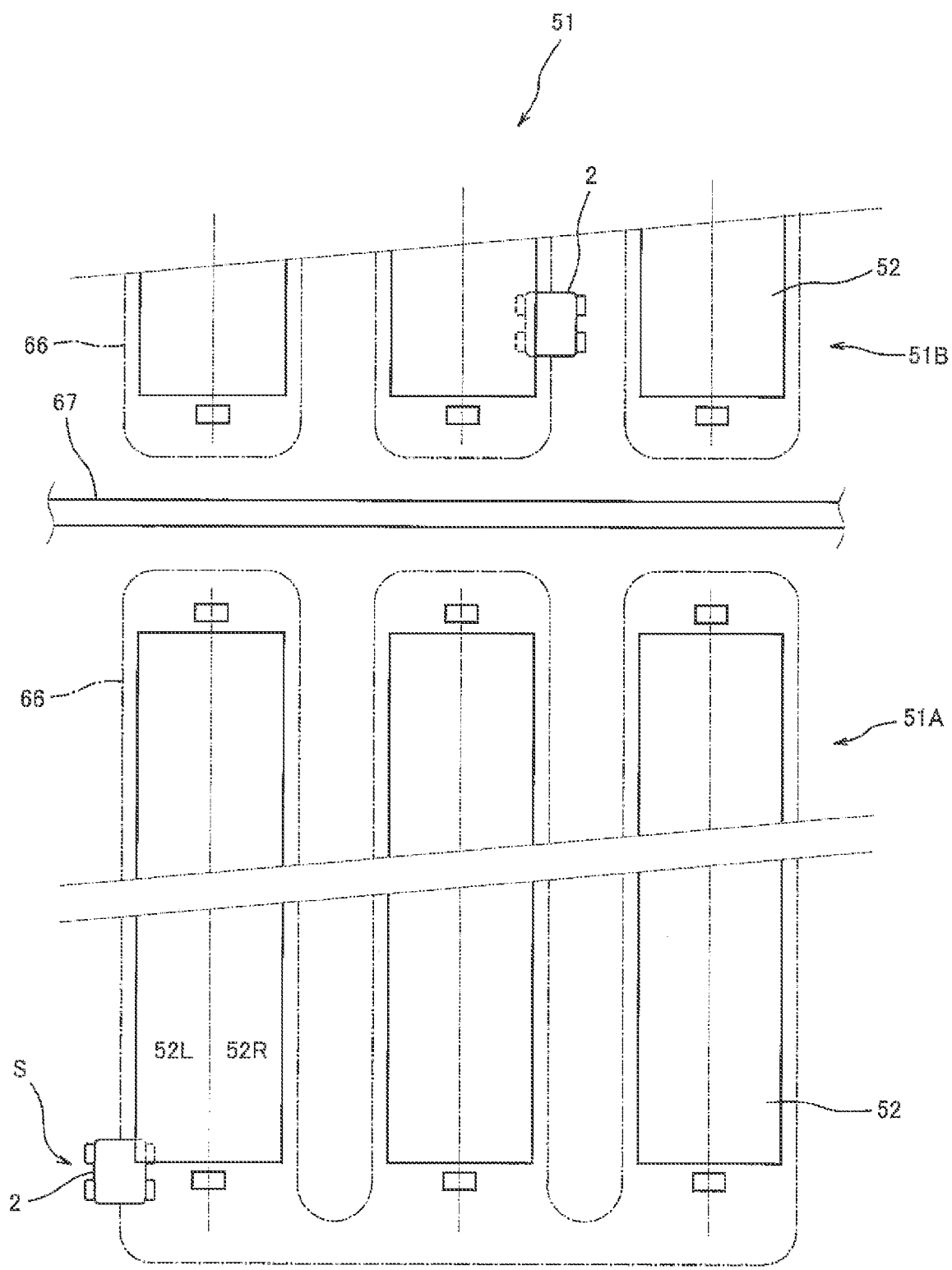
FIG. 9 is a plan view showing one example of a track for travel of the cleaning device in a solar field installed with parabolic trough type collectors.
Figure 10:
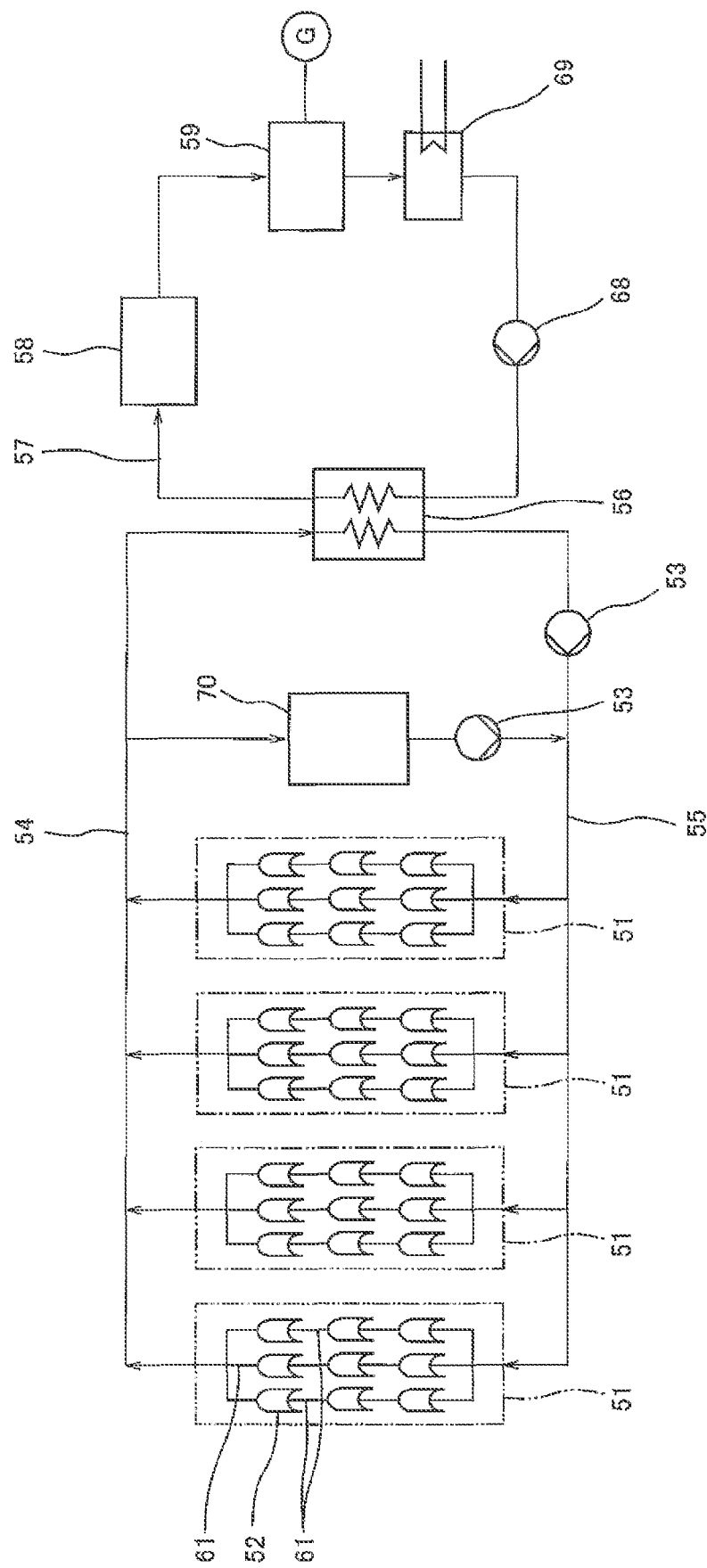
FIG. 10 is a schematic view showing one example of a solar thermal electric power generation system using parabolic trough type collectors to which the present invention is applicable.

FIG. 9 shows a continuous traveling track 66 for the truck 2 formed along the collectors 52 in the solar field 51. The track 66 allows a single truck 2 to make a round tour in a predetermined range of the solar field 51. Specifically, the aforementioned rail 31 or 32 is laid to draw a loop so as to allow the truck 2 to depart from the base position S (from which the truck 2 usually starts traveling), to make a round tour while cleaning of each of the collectors 52 located in the predetermined range, and to return to the base position S. Driving and stopping of the truck 2 and actuation and stopping of the air blow device 3 or the like may be controlled by a control device either on truck 2 or remotely from the control center. After completion of cleaning of one widthwise side 52L of the collectors 52 and before cleaning of the opposite widthwise side 52R of the collectors 52, the collectors 52 are rotated 300 degrees or more to orient downward (see the dashed double-dotted line in FIG. 5).

It is possible that: the control device records cleaning operations which are performed by the truck 2 during its daily tour in the solar field 51; and cleaning operation parameters obtained from a case where the shortest traveling time is achieved (for example, the traveling speed of the truck 2, the amount or the pressure of the blown air, the dimension of a gap between the air nozzle 19 and each reflecting surface 52a, the horizontal position of the air nozzle 19 on the truck 2 (i.e., X-Z coordinate position), the inclination angle of the louver 19, and the like), are set as optimum values. This feature contributes to realization of a highly efficient cleaning operation.

The nighttime (T1) during which solar thermal electric power generation is stopped varies through a year. In order to complete cleaning of the collectors 52 within the time T1, the traveling speed (V1) of the truck 2 is determined from the total distance of travel (D1). Preferably, the truck 2 travels at a higher speed than V1. In cases where the speed V1 has to be set considerably high because the solar field happens to be extensive, the solar field may be divided into several sections, each of which is provided with respective traveling track loops for respective trucks 2 to be used. With this configuration, troublesome and complicated cleaning operations, which have to rely upon humans in the nighttime, can be automated efficiently.

The cleaning device may be used in order to determine the necessity of cleaning of each reflecting surface 52a by measuring the soiling degrees of the respective reflecting surfaces 52a in a relatively short time while traveling through the solar field 51 with the air supply device 2 stopped and without performing cleaning operations. Further, since those reflecting surfaces which have unusually soiled portions include damaged reflecting surfaces, it is possible to check abnormalities of the reflecting surfaces.

In a typical solar thermal electric power generation system, it is a common practice to divide the solar field 51 into two opposite solar fields (51A and 51B) as shown in FIG. 9 and install an electric power generating equipment (not shown) in a central area therebetween. Large-diameter piping 67 for heat-transfer oil circulation is laid on the ground so as to extend through the central area. Therefore, it is difficult for the truck 2 to cross the large-diameter piping 67. For this reason, it is preferable that the opposite solar fields 51A and 51B are basically provided with respective trucks 2.

Since the cleaning device according to the present invention is related with cleaning collectors of a solar thermal electric power generation system, such a solar thermal electric power generation system may be an integrated solar combined cycle electric power generation system using a gas turbine and a steam turbine. Alternatively, without limitation to such an integrated solar combined cycle electric power generation system, the solar thermal electric power generation system may be an electric power generation system which relies only upon steam turbine electric power generation and is not combined with a gas turbine.

Each collector is not limited to a collector of the aforementioned parabolic trough type reflecting mirror. The present invention is applicable to a heat collecting device using reflecting mirrors of any other type than the parabolic trough type, for example, a Fresnel type, a so-called tower type, or the like.

Figure 12:
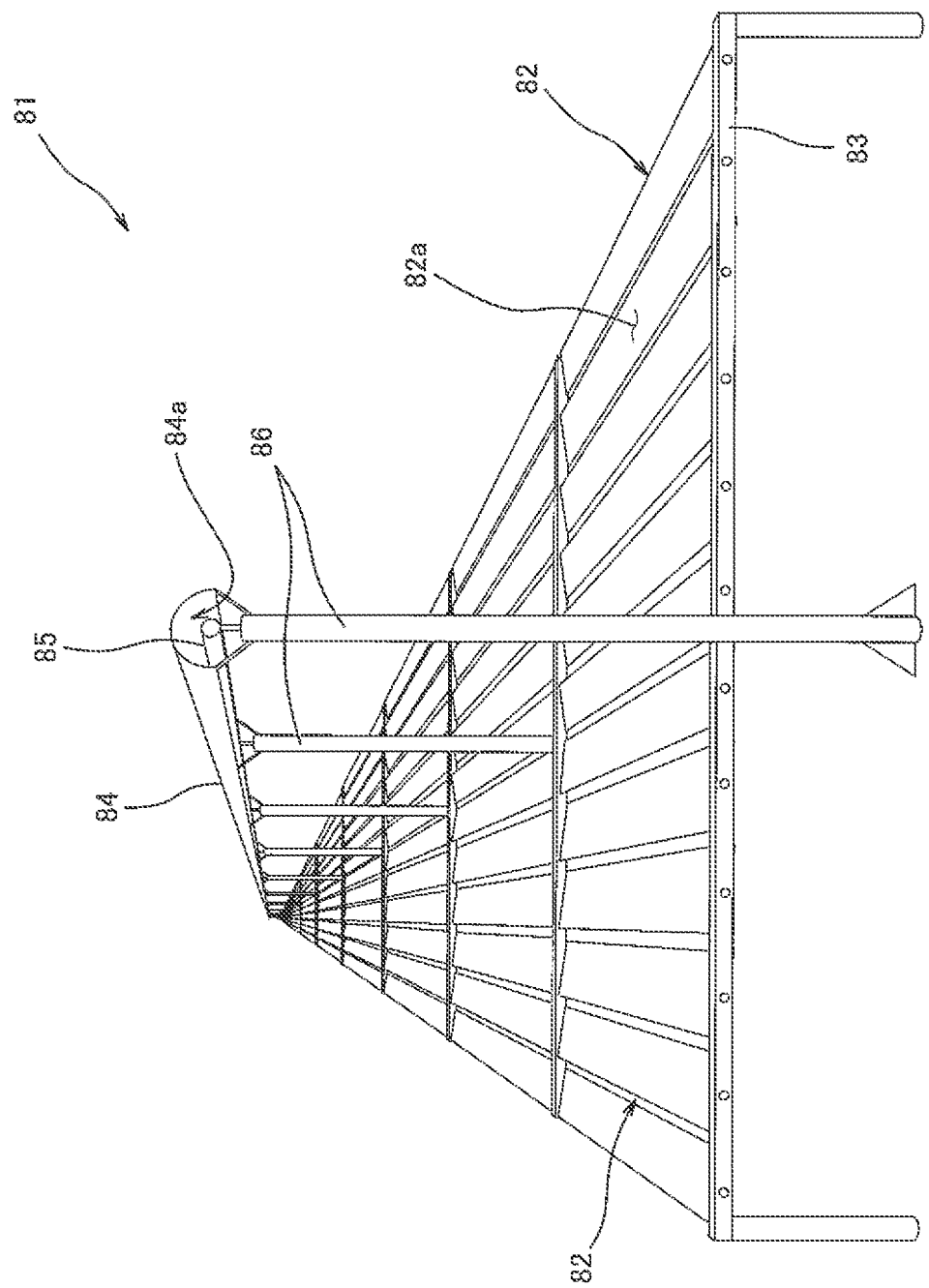
FIG. 12 is a perspective view showing a Fresnel type collector as another example of a collector to which the present invention is applicable.

FIG. 12 schematically shows a solar thermal electric power generation system using a Fresnel type collector 81. The Fresnel type collector (hereinafter will be simply referred to as "collector" as the case may be) 81 has a multiplicity of strap-shaped flat reflecting mirrors 82 continuously arranged side by side on a support frame 83. Each of the flat reflecting mirrors 82 is pivotally supported on the support frame 83 so as to be capable of pivoting about a shaft extending in the longitudinal direction thereof. A multiplicity of such support frames 83 each equipped with a multiplicity of such flat reflecting mirrors 82 are aligned in the longitudinal direction of the flat mirrors 82. Another reflecting minor 84 shaped like a semicylindrical tube extends parallel with the pivoting shafts of all the flat reflecting minors 82 at a higher level than the flat reflecting mirrors 82, with its reflecting surface 84a oriented downward. A heat absorbing tube 85 extends longitudinally of the reflecting mirror 84 at a center of a lower side of a cross section of the reflecting mirror 84 shaped like a semicircle. The reflecting mirror 84 and the heat absorbing tube 85 are both supported by pillars 86. The sunlight reflected by the multiplicity of the flat reflecting mirrors 82 arranged below the reflecting mirror 84 reaches the reflecting minor 84 extending above the flat reflecting mirrors 82. The sunlight is further reflected so as to be focused on the heat absorbing tube 85. A heat transfer medium circulating in such heat absorbing tube 85 collects and recovers heat by absorbing solar heat. Each of the heat absorbing tubes 85 has ends each connected to a respective one of ends of an adjacent heat absorbing tube 85 through a connecting pipe (not shown). All the flat reflecting mirrors 82 are caused to turn for tracking the sun by a driving device (not shown) so as to allow their respective reflecting surfaces 82a to reflect sunlight toward the reflecting mirror 84 constantly.

Figure 13:
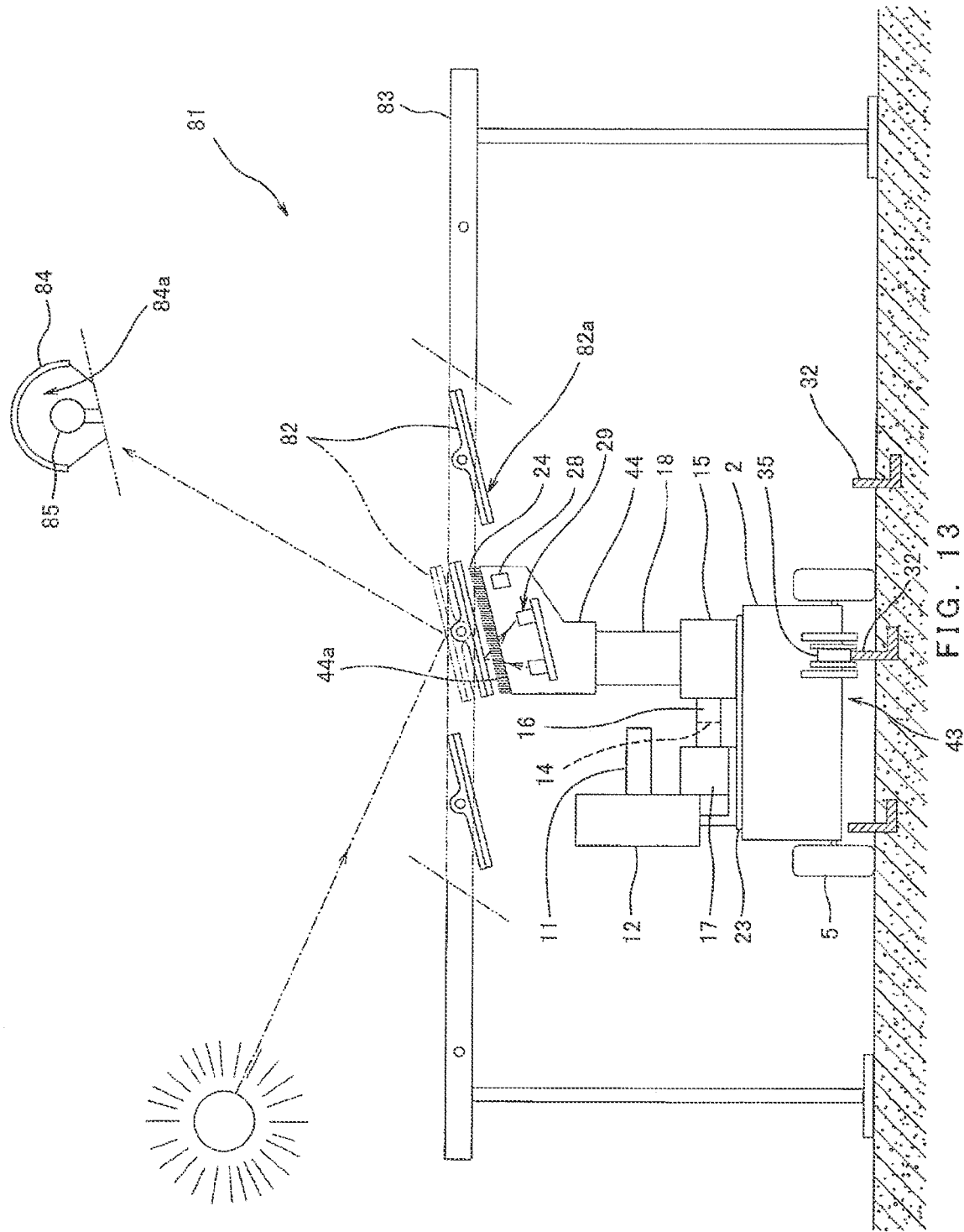
FIG. 13 is a front elevational view showing one embodiment of a cleaning device suitable for the Fresnel type collector shown in FIG. 12.

FIG. 13 shows a cleaning device 43 suitable for cleaning the Fresnel type collector 81. The cleaning device 43 has a vertical dimension which allows the cleaning device 43 to move below the support frame 83 and has a similar structure with the cleaning device 1 shown in FIG. 1. Members of the cleaning device 43 which are like the corresponding members of the cleaning device 1 are designated by like reference characters in order to omit descriptions thereof. The cleaning device 43 is provided with an air nozzle 44 shaped to meet the shape and position of the reflecting surface 82a of the collector 81. In the nighttime, the reflecting surfaces 82a of the collector 81 are often oriented by rotating the flat reflecting mirrors 82 in such a predetermined downward direction (depicted by solid line in FIG. 13), that is applied for their maintenance. That is, the normal to each reflecting surface 82a is oriented downward. The air nozzle 44 has a top end peripheral edge 44a having a linear shape inclined at an inclination angle equal or approximate to that at which the reflecting surface 82a is oriented in the predetermined downward direction (see FIG. 13). The air blowing opening of the air nozzle 44 can be positioned relative to each reflecting surface 82a by moving the aforementioned common base plate 23 in the horizontal directions and moving the air nozzle 44 up and down. The orientation of each reflecting surface 82a is not limited to the slightly downward direction shown, but may be in a vertically downward direction, a horizontal direction, or the like. The top end peripheral edge 44a of the air nozzle 44 may be shaped to meet each reflecting surface 82a in that orientation, or, in reverse, the rest position of each reflecting surface 82a may be adjusted to the top end peripheral edge 44a of the air nozzle 44. In FIG. 13, a flat reflecting mirror 82 with its reflecting surface 82a oriented upward in the daytime is depicted by dashed double-dotted line.

The brush 24 is removably provided on the top end peripheral edge 44a of the air nozzle 44. The top end peripheral edge 44a may be shaped to define a gap between the top end of peripheral edge 44a and reflecting surface 82a which expands gradually as the reflecting surface 82a extends from one widthwise side thereof toward an opposite widthwise side thereof when the top end peripheral edge 44a is brought close to the reflecting surface 82a. In this case, the top end peripheral edge 44a may be provided with a portion free of the brush 4 for allowing the blown air to pass therethrough, as in the air nozzle 19 shown in FIG. 1. Alternatively, it is possible that the top end peripheral edge 44a has a linear shape inclined at an inclination angle equal or approximate to that at which the reflecting surface 82a is inclined while a side plate of the air nozzle 44 which lies closer to one widthwise side of the reflecting surface 82a is partially cut-out as in the air nozzle 25 shown in FIG. 2. Such a shape allows the air blown from the air nozzle 44 to pass through the cutout portion, thereby making it easy to blow out the air conformally to the reflecting surface 82a. The air nozzle 44 ma be internally provided with the louvers 27 as shown in FIGS. 2 to 4. The position of the portion free of the brush 4, the position of the cutout portion, the direction in which the louvers are mounted, or the like may be determined so that the air blow direction coincides with the longitudinal direction of each flat reflecting mirror 82.

Each flat reflecting mirror 82 of the Fresnel type collector 81 shown in FIGS. 12 and 13 is pivotally supported on the support frame at its opposite ends. Some solar thermal electric power generation systems use another Fresnel type collector having flat reflecting mirrors 82 each provided with vertically positioned rings at opposite ends thereof. Each reflecting mirror 82 is turned by rotation of these rings. The cleaning device 43 shown in FIG. 13 is capable of traveling without interference with the rings by lowering the position of its air nozzle 44 timely to keep away from the rings.

Since each flat reflecting mirror 82 of the Fresnel type collector usually has a width of about 400 to 600 mm, the flat reflecting mirrors 82 are arranged side by side with an arrangement pitch (indicated by reference character P in FIG. 14) that is much smaller than an arrangement pitch with which the parabolic trough type reflecting mirrors 60 shown in FIG. 11 are arranged. Therefore, the layout of the track 66 as shown in FIG. 9 is challenging to employ.

Figure 14:
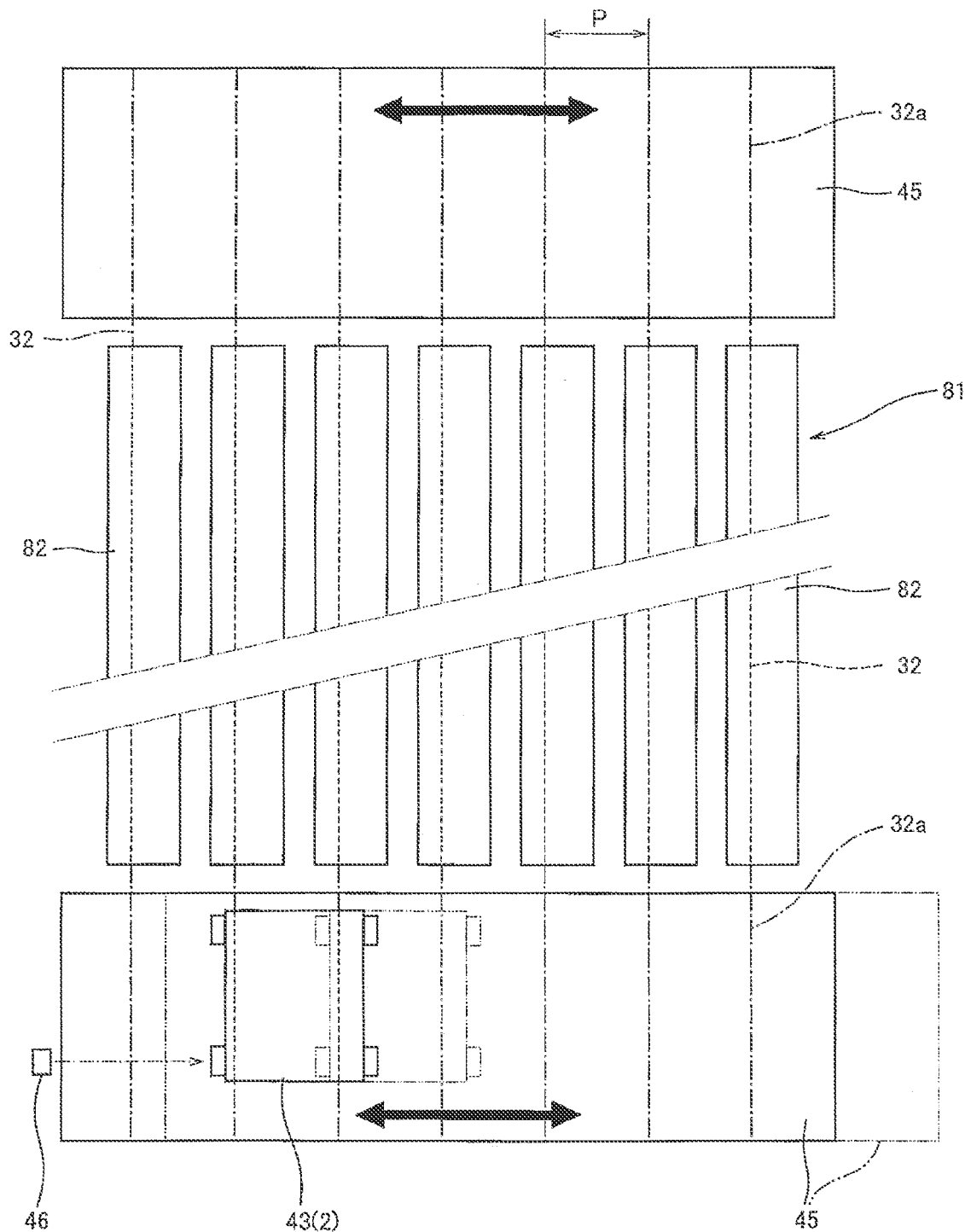
FIG. 14 is a plan view showing one example of a track for travel of the cleaning device in a solar field installed with Fresnel type collectors.

In view of this difficulty, a solar field of Fresnel type collectors 81 is provided with travel guide rails 32 for the truck 2, each of which is laid to extend along a respective one of lines of flat reflecting mirrors 82, as shown in FIG. 14. Further, slide plates 45 each fitted with extension rail portions 32a of all the guide rails 32 are provided on opposite end sides of all the guide rails 32 outwardly of the lines of the flat reflecting mirrors 82. The whole of the guide rails 32 and the whole of the extension rail portions 32a are separated from each other, but the longitudinal directions thereof coincide with each other. Preferably, a detection device 46, such as an ultrasonic sensor, an infrared sensor, or a proximity switch, is provided at an appropriate position on each slide plate 45 or outwardly of an end portion of each slide plate 45 for detecting the cleaning device 43 on the slide plate 45. When the cleaning device 43 reaches a certain extension rail portion 32a after completion of cleaning of the associated line of flat reflecting mirrors 82, the detection device 46 detects the cleaning device 43. In response to detection, the slide plate 45 is caused to shift by one pitch P in a direction perpendicular to the longitudinal direction of the rails 32. With this configuration, the cleaning device 43 can move onto an adjacent one of the rails 32 sequentially and start cleaning the next line of flat reflecting mirrors 82. Another track layout may be employed without limitation to the above-described track layout. The track layout using such slide plates 45 may be applied to the solar field 51 installed with the aforementioned parabolic trough type collectors 52 (see FIG. 7).

Figures 15A, 15B:
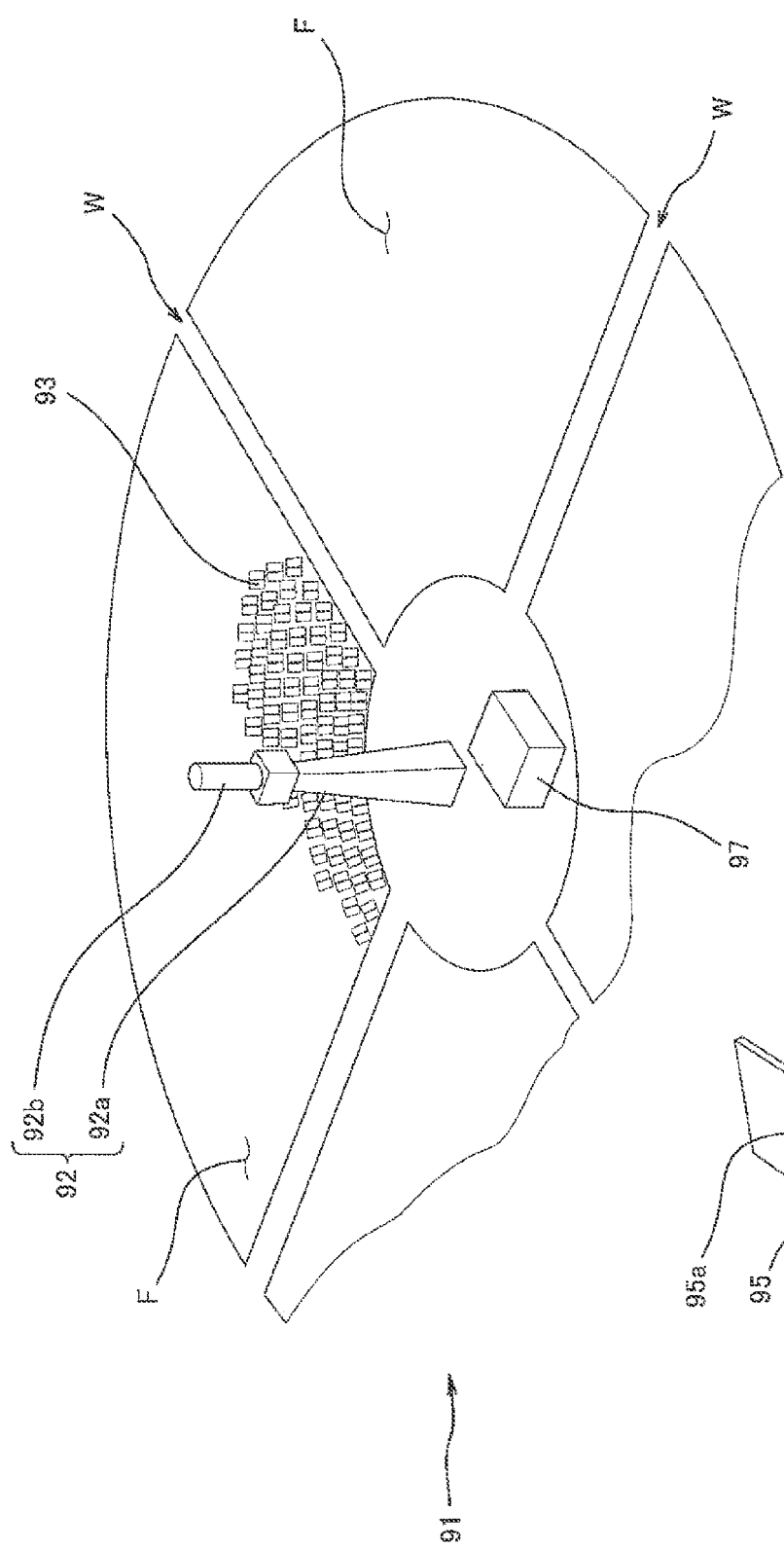
FIG. 15A is a perspective view showing a tower type collector as another example of a collector to which the present invention is applicable.
FIG. 15B is an enlarged perspective view showing a heliostat provided on the tower type collector shown in FIG. 15A.

FIG. 15A schematically shows a solar thermal electric power generation system including a tower type solar heat collecting system (hereinafter will be referred to also as "tower type collector") 91 using independent self-supporting flat reflecting mirrors (hereinafter will be referred to as "heliostats") 93. The collector 91 often has an arrangement wherein a heat collecting tower 92 is centered and a multiplicity of heliostats 93 are arranged on concentric circles, concentric semicircles, concentric polygons, or the like. Each heliostat is a reflecting mirror configured to change its orientation to track the moving sun. In the present embodiment, the heliostats 93 are arranged on multiple concentric circles. In a central circular space of a solar field, there are provided the heat collecting tower 92 and electric power generation equipment 97. The annular solar field excluding the central circular space is divided into sector zones F each possibly having an open angle of 90 degrees by radial passages W. FIG. 15A describes only a part of the heliostats 93 and omits descriptions of the rest. The heat collecting tower 92 comprises a tower 92a and a heat collecting device 92b mounted at a top end of the tower 92a. The heat collecting device 92b is provided with a heat supply section (not shown) and a heat transfer medium circulating section (not shown) in which a heat transfer medium (air, molten salt, or the like) to be heated by the heat supply section is circulated.

Figure 16:
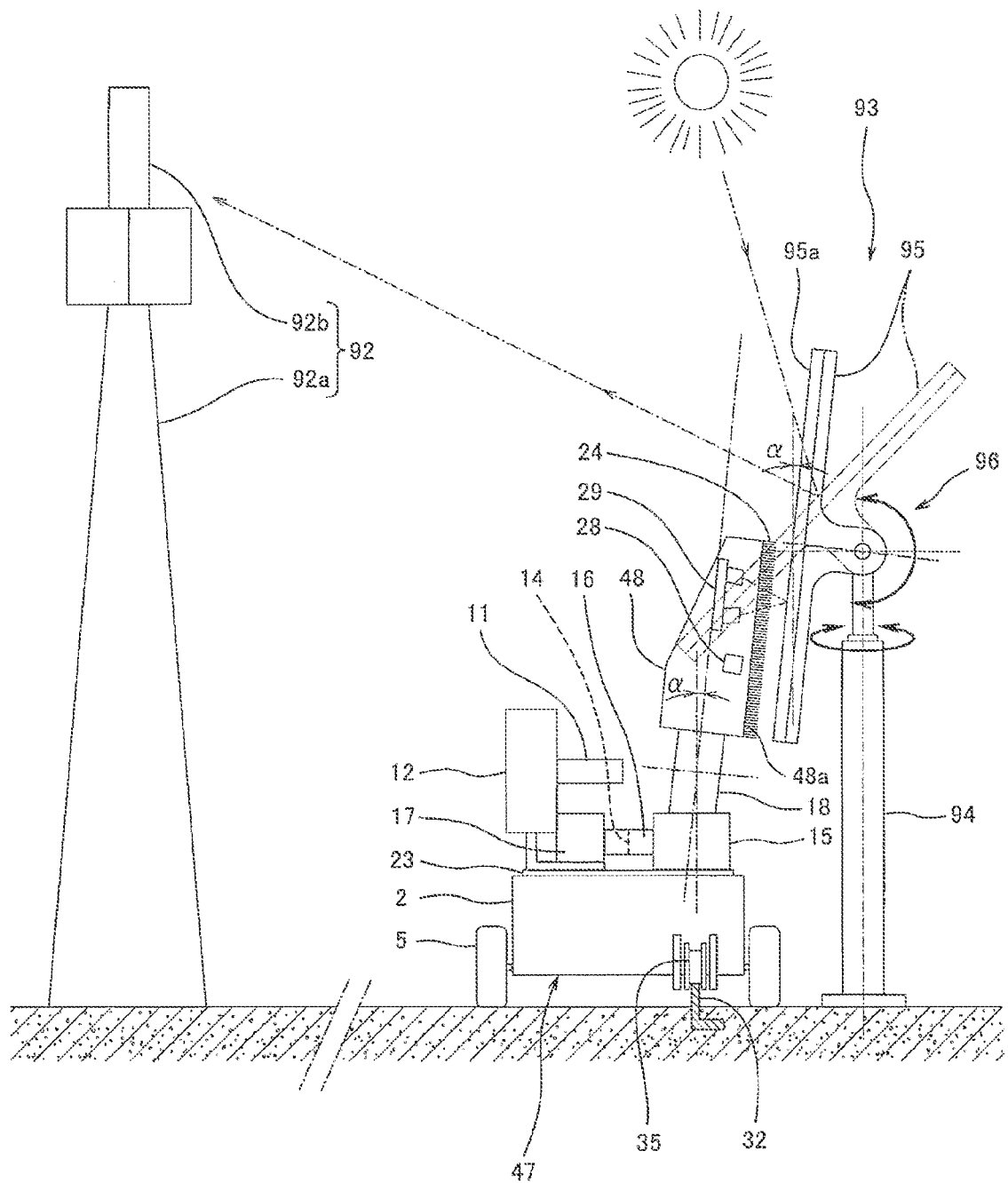
FIG. 16 is a front elevational view showing one embodiment of a cleaning device suitable for the heliostat of the tower type collector shown in FIG. 15.

As shown in FIGS. 15B and 16, each heliostat 93 includes a pillar 94, a flat reflecting mirror 95 mounted at a top end of the pillar 94, and a rotation and swing driving device 96 configured to rotate the flat reflecting mirror 95 about a vertical axis while inclining the flat reflecting mirror 95 up and down. The flat reflecting minor 95 of each heliostat 93 is turned to track the movement of the sun by the rotation and swing driving device 96 so as to be capable of reflecting sunlight toward the heat collecting device 92b constantly.

FIG. 16 also shows a cleaning device 47 suitable for cleaning of each heliostat 93. Since the basic structure of the cleaning device 47 is similar to the foregoing device 1 shown in FIG. 1, description will be made only of the dissimilarities therebetween, and members of the cleaning device 47 which are like the corresponding members of the cleaning device 1 shown in FIG. 1 are designated by like reference characters in order to omit descriptions thereof. The cleaning device 47 is provided with an air nozzle 48 shaped to meet the shape and position of the reflecting surface 95*a* of each heliostat 93. All the heliostats 93 are swung and rotated to orient in the same predetermined direction for their maintenance and cleaning. As is often the case, each reflecting surface 95*a* (i.e., the normal to the reflecting surface 95*a*) is oriented substantially horizontally as depicted by solid line in FIG. 16 for easy maintenance. Specifically, the reflecting surface 95*a* itself is inclined at a small angle α degrees from a vertical plane.

The flat reflecting surfaces 95*a* of all the reflecting mirrors 95 oriented substantially horizontally are further oriented to the heat collecting tower 92. The air nozzle 48 has an air blowing opening formed to orient substantially horizontally so as to face each reflecting surface 95*a* in that orientation. That is, the normal to the plane defined by the air blowing opening is oriented substantially horizontally. The air nozzle 48 has an opening peripheral edge 48*a* having a linear shape inclined at an inclination angle α degrees which is equal or approximate to that at which the reflecting surface 95*a* in that orientation is inclined. The air nozzle 48 and an air supply tube 18 which is fitted in the air nozzle 48 so as to allow the air nozzle 48 to move up and down, extend not in a vertical direction but in a direction along the reflecting surface 95*a*, i.e., a direction inclined at a degrees relative to a vertical plane. The air nozzle 48 is capable of moving up and down in the same direction. Thus, the air nozzle 48 is capable of reciprocating (moving up and down) in a direction in the plane defined by its air blowing opening. Of course, the reflecting surface 95*a* may be oriented in any other direction without limitation to the substantially horizontal direction shown. The opening peripheral edge 48*a* of the air nozzle 48 is simply shaped to meet the reflecting surface 95*a* in that orientation. In FIG. 16, the flat reflecting mirror 95 with its reflecting surface 95*a* oriented obliquely upward in the daytime is depicted by dashed double-dotted line.

The brush 24 is removably provided along the opening peripheral edge 48*a* of the air nozzle 48. Therefore, the cleaning device 47 can brush the reflecting surface 95*a* by the air nozzle 48 moving up and down. The opening peripheral edge 48*a* may be shaped to define a gap between the opening peripheral edge 48*a* and with the reflecting surface 95*a* which expands gradually as the reflecting surface 95*a* extends from a lower end side thereof toward an upper end side thereof when the opening peripheral edge 48*a* is brought close to the reflecting surface 95*a*. In this case, the opening peripheral edge 48*a* may be provided with a portion free of the brush 4 for allowing the blown air to pass therethrough, as in the air nozzle 19 shown in FIG. 1. Alternatively, it is possible that the opening peripheral edge 48*a* has a linear shape inclined at an inclination angle equal to that at which the reflecting surface 95*a* is inclined and furthermore a side plate of the air nozzle 52*a* which lies closer to the upper end side of the reflecting surface 95*a* is partially cut-out as in the air nozzle 25 shown in FIG. 2. Such a shape allows the air blown from the air nozzle 48 to pass through the cutout portion, thereby making it easy to blow out the air along the reflecting surface 95*a*. The air nozzle 48 may be provided with the louvers 27 as shown in FIGS. 2 to 4. The position of the portion free of the brush 4, the position of the cutout portion, the direction in which the louvers are mounted, or the like may be determined so that the air blow direction coincides not with the aforementioned upward direction but with a horizontal direction, an obliquely upward direction, or a downward direction.

Figure 17:
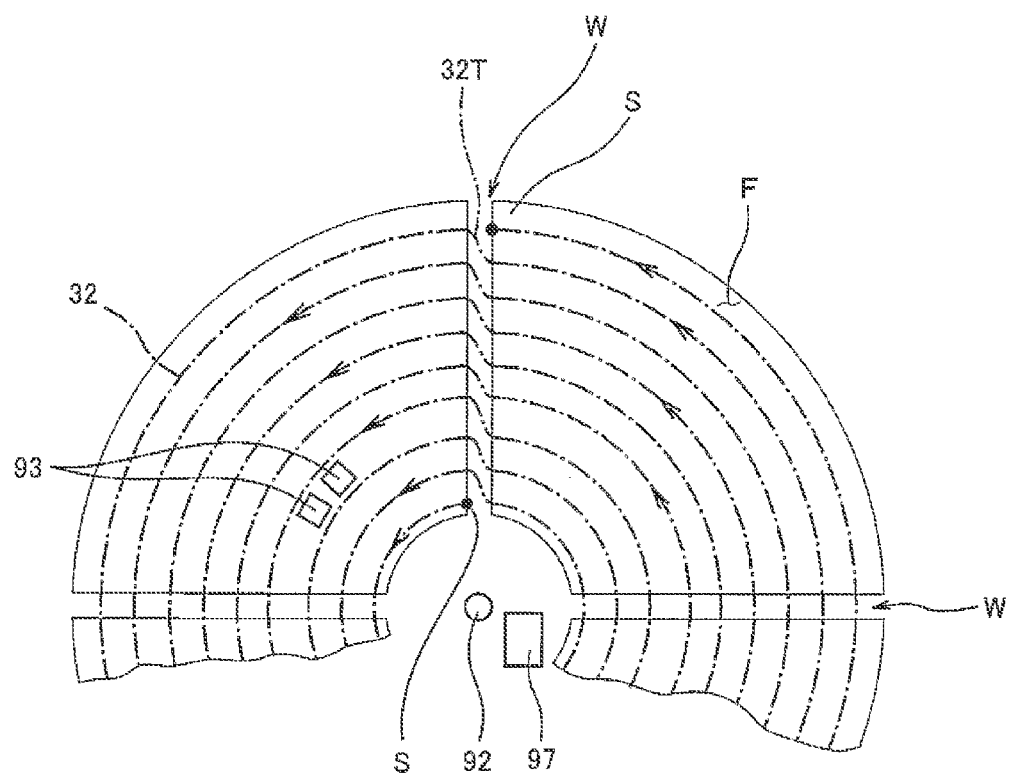
FIG. 17 is a plan view showing one example of a track for travel of the cleaning device in a solar field installed with a tower type collector.

The tower type collector 91 using the heliostats 93 allows a touring track of the cleaning device 47 to be provided therein easily. In the solar field illustrated in FIG. 15A in which the heliostats 93 are arranged concentrically, base positions S are determined on the innermost side and the outermost side, as shown in FIG. 17. Each of the base positions S indicates a truck's travel starting point and a cleaning completion point. A railway (for example the guide rail 32) is laid over the circumferences of all the circles so as to pass just in front of each heliostat 93. One radial passage W extending in the solar field is provided with transition area rails 32T each laid for transition to an adjacent circle. Thus, one guide rail 32 may interconnect the base position S on the innermost circumference and the base position S on the outermost circumference.

Figure 18:
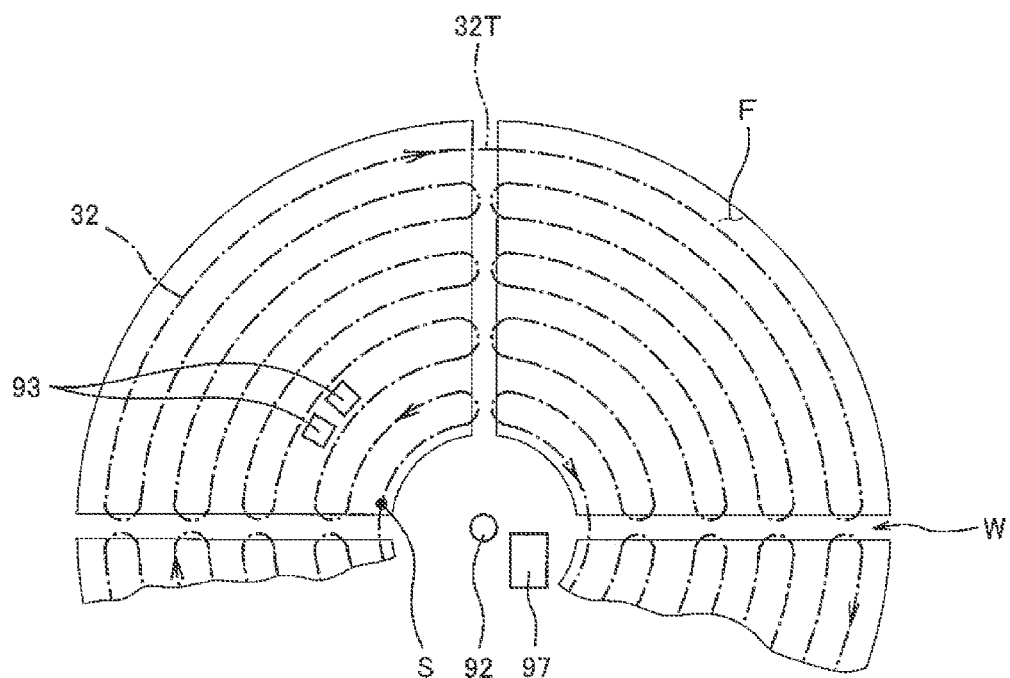
FIG. 18 is a plan view showing another example of a track for travel of the cleaning device in a solar field installed with a tower type collector.

Alternatively, in each of the 90 degrees sector zones F dividing the solar field, the guide rail 32 is laid zigzag from the base position S on the inner side (or outer side) of the sector zone F toward the outer side (or inner side), as shown in FIG. 18. The rails 32T are laid out so as to transition between adjacent sector zones F at the outermost and innermost circumferences across the radial passages W. This arrangement allows the single guide rail 32 to make a tour of all the sector zones F from the base position S on the innermost (or outermost) circumference while passing in front of all the heliostats 93. For the convenience of traffic on the radial passages W, those portions of each of the rails 32 shown in FIGS. 17 and 18 which cross the radial passages W can be made to move up and down between their underground position and overground position.

The foregoing embodiments are only illustrative and may be modified or changed variously without departing from the concept of the present invention. Therefore, the present invention is not limited to the foregoing embodiments.

It will be apparent from the foregoing description that various variations and embodiments of the present invention may occur to those skilled in the art. Therefore, the foregoing description should be construed as an illustration in conjunction with the drawings and is provided for the purpose of teaching those skilled in the art to become capable of carrying out the present invention. The details of the above-described structure and/or function of the present invention can be modified variously and substantially without departing from the spirit of the present invention and, therefore, such modifications should be construed to be included within the scope of the present invention.

INDUSTRIAL APPLICABILITY

The present invention provides a device for cleaning reflecting surfaces of a collector by using air, which is inexhaustible in any region. For this reason, the device is useful as a cleaning device for collectors of a solar thermal electric power generation system installed in a place in which no water source exists or water is very valuable, such as a desert.

The invention claimed is:

1. A cleaning device for cleaning a sunlight reflecting surface of a sunlight collecting device included in a solar thermal electric power generation system, which comprises:
    an air supply device; and
    an air nozzle configured to blow air supplied from said air supply device against said sunlight reflecting surface to clean said sunlight reflecting surface,
    wherein said air nozzle has a top end peripheral edge defining an air blowing opening at a top end of said air nozzle, said top end peripheral edge having a curvature or an inclination angle equal or approximate to a curvature or an inclination angle of said sunlight reflecting surface on an obverse side of said sunlight reflecting surface.

2. The cleaning device according to claim 1, further comprising a movable truck, wherein said air supply device and said air nozzle are mounted on said truck.

3. The cleaning device according to claim 2, wherein said truck is provided with a travel driving device by which said truck is rendered capable of self-propelled traveling.

4. The cleaning device according to claim 1, further comprising a driving device configured to extend and retract said air nozzle in an air blowing direction thereof for moving a top end of said air nozzle toward and away from said sunlight reflecting surface, wherein:
the driving device is configured to adjust a range of extension and retraction of said air nozzle.

5. The cleaning device according to claim 1, further comprising a driving device configured to move said air nozzle in a direction in a plane defined by an air blowing opening of said air nozzle for moving said air blowing opening of said air nozzle along said sunlight reflecting surface, wherein
the driving device is configured to adjust a distance of movement of said air nozzle.

6. The cleaning device according to claim 1, wherein:
said sunlight reflecting surface is constructed of a parabolic trough having a parabolic cross section; and
said top end peripheral edge defining said air blowing opening at the top end of said air nozzle has an arc shape having a curvature equal or approximate to the curvature of said sunlight reflecting surface on the obverse side of said sunlight reflecting surface to define a gap between said top end peripheral edge of said air nozzle and said sunlight reflecting surface, the spacing expanding gradually as the sunlight reflecting surface extends from a widthwise end thereof toward a widthwise center thereof.

7. The cleaning device according to claim 1, wherein:
said sunlight reflecting surface is constructed of a parabolic trough having a parabolic cross section;
said top end peripheral edge defining said air blowing opening at the top end of said air nozzle with an arc shape having a curvature equal or approximate to the curvature of said sunlight reflecting surface on the obverse side of said sunlight reflecting surface, while said air nozzle has a rectangular tubular shape; and
a side plate of said air nozzle defining part of said air blowing opening which lies closer to a widthwise center of said sunlight reflecting surface is partially cut-out.

8. The cleaning device according to claim 1, wherein said air nozzle has an internal air passage provided with at least one flow direction adjustor plate for adjusting an air flow direction, said flow direction adjustor plate being configured to adjust an inclination angle thereof.

9. The cleaning device according to any one of claim 1, wherein said air nozzle has a top end peripheral edge removably provided with a brush for cleaning said sunlight reflecting surface.

10. A cleaning device for cleaning a sunlight reflecting surface of a sunlight collecting device included in a solar thermal electric power generation system, which comprises:
an air supply device;
an air nozzle configured to blow air supplied from said air supply device against said sunlight reflecting surface to clean said sunlight reflecting surface; and
a distance sensor for measuring a spacing between a top end of said air nozzle and said sunlight reflecting surface.

11. The cleaning device according to claim 1, further comprising a soiling degree measuring device for measuring a soiling degree of said sunlight reflecting surface, wherein:
said soiling degree measuring device includes a light projecting device configured to project a measuring light and a light receiving device configured to receive the measuring light reflected by said sunlight reflecting surface; and
said soiling degree measuring device is configured to measure the soiling degree of said sunlight reflecting surface based on a degree of reduction in intensity of the measuring light reflected by said sunlight reflecting surface when compared with intensity of the measuring light projected.

12. The cleaning device according to claim 11, wherein said soiling degree measuring device is configured to measure the soiling degree of said sunlight reflecting surface before said sunlight reflecting surface is subjected to the air blow by said air nozzle and the soiling degree of said sunlight reflecting surface after said sunlight reflecting surface has been subjected to the air blow, and comparison is made between the two soiling degrees measured to detect an effect of cleaning of said sunlight reflecting surface.

13. A cleaning device for cleaning a sunlight reflecting surface of a sunlight collecting device included in a solar thermal electric power generation system, which comprises:
an air supply device;
an air nozzle configured to blow air supplied from said air supply device against said sunlight reflecting surface to clean said sunlight reflecting surface;
a soiling degree measuring device for measuring a soiling degree of said sunlight reflecting surface, wherein:
said soiling degree measuring device includes a light projecting device configured to project a measuring light and a light receiving device configured to receive the measuring light reflected by said sunlight reflecting surface; and
said soiling degree measuring device is configured to measure the soiling degree of said sunlight reflecting surface based on a degree of reduction in intensity of the measuring light reflected by said sunlight reflecting surface when compared with intensity of the measuring light projected and before said sunlight reflecting surface is subjected to the air blow by said air nozzle and the soiling degree of said sunlight reflecting surface after said sunlight reflecting surface has been subjected to the air blow, and comparison is made between the two soiling degrees measured to detect an effect of cleaning of said sunlight reflecting surface and said air supply device is configured to be capable of adjusting at least one of an air supply amount and an air supply pressure and adjusting at least one of an air blow amount and an air blow pressure based on at least one of the soiling degrees measured by the soiling degree measuring device and the cleaning effect detected.

14. A cleaning device for cleaning a sunlight reflecting surface of a sunlight collecting device included in a solar thermal electric power generation system, which comprises:
an air supply device;
an air nozzle configured to blow air supplied from said air supply device against said sunlight reflecting surface to clean said sunlight reflecting surface;
a soiling degree measuring device for measuring a soiling degree of said sunlight reflecting surface;
a driving device configured to extend and retract said air nozzle in an air blowing direction thereof for moving a top end of said air nozzle toward and away from said sunlight reflecting surface, wherein:
the driving device is configured to adjust a range of extension and retraction of said air nozzle,
a gap between the top end of said air nozzle and said sunlight reflecting surface is adjustable based on at least one of the soiling degree measured by said soiling degree measuring device and the cleaning effect detected;
wherein said soiling degree measuring device includes a light projecting device configured to project a measuring light and a light receiving device configured to receive the measuring light reflected by said sunlight reflecting surface; and
said soiling degree measuring device is configured to measure the soiling degree of said sunlight reflecting surface based on a degree of reduction in intensity of the measuring light reflected by said sunlight reflecting surface when compared with intensity of the measuring light projected and before said sunlight reflecting surface is subjected to the air blow by said air nozzle and the soiling degree of said sunlight reflecting surface after said sunlight reflecting surface has been subjected to the air blow, and comparison is made between the two soiling degrees measured to detect an effect of cleaning of said sunlight reflecting surface.

15. A cleaning device for cleaning a sunlight reflecting surface of a sunlight collecting device included in a solar thermal electric power generation system, which comprises:
an air supply device;
an air nozzle configured to blow air supplied from said air supply device against said sunlight reflecting surface to clean said sunlight reflecting surface;
a movable truck, wherein said air supply device and said air nozzle are mounted on said truck; and
soiling degree measuring devices each located on a respective one of a forward side and a rearward side of said air nozzle in a direction of travel of said truck for measuring a soiling degree of said sunlight reflecting surface, wherein
wherein each of said soiling degree measuring devices include a light projecting device for projecting a measuring light and a light receiving device for receiving the measuring light reflected by said sunlight reflecting surface;
each of said soiling degree measuring devices are configured to measure soiling degrees of said sunlight reflecting surface based on a degree of reduction in intensity of the measuring light reflected by said sunlight reflecting surface when compared with intensity of the measuring light projected; and
the two soiling degree measuring devices measure a soiling degree of said sunlight reflecting surface before said sunlight reflecting surface is subjected to the air blow and a soiling degree of said sunlight reflecting surface after said sunlight reflecting surface has been subjected to the air blow, and comparison is made between the two soiling degrees measured to detect a cleaning effect.

16. The cleaning device according to claim 15, wherein said truck is configured to be capable of adjusting a traveling speed thereof based on the cleaning effect detected.

17. The cleaning device according to claim 15, further comprising a driving device configured to extend and retract said air nozzle in an air blowing direction thereof for moving a top end of said air nozzle toward and away from said sunlight reflecting surface, wherein:
the driving device is configured to adjust a range of extension and retraction of said air nozzle,
said air nozzle has a top end peripheral edge removably provided with a brush for cleaning said sunlight reflecting surface; and
when a difference between the soiling degrees of said sunlight reflecting surface measured by said soiling degree measuring devices on the forward side and the rearward side of said air nozzle before cleaning and after cleaning by said air nozzle during said truck traveling is smaller than a predetermined threshold value, said air nozzle is extended to bring said brush into contact with said sunlight reflecting surface for brushing.

18. The cleaning device according to claim 17, wherein when the soiling degree resulting from measurement on said sunlight reflecting surface obtained by said soiling degree measuring device on the rearward side of said air nozzle after brushing by said brush is worse than a predetermined soiling degree, said truck makes at least one round-trip movement in a predetermined range of a truck's track to cause said brush to repeat brushing.

19. The cleaning device according to claim 18, further comprising a travel distance measuring device for measuring a distance of travel of said truck, wherein:
a location of the sunlight reflecting surface arranged along said truck's track is specified based on the distance of travel of said truck measured by said travel distance measuring device; and
when said sunlight reflecting surface has a soiling degree worse than said predetermined soiling degree after repeated brushing, the location of the sunlight reflecting surface is recorded.

20. The cleaning device according to claim 1, further comprising a vibrating device included in the cleaning device provided on said sunlight collecting device for vibrating said sunlight collecting device.

21. The cleaning device according to claim 2, wherein said truck is provided with a camera for taking a photograph of said sunlight reflecting surface after cleaning.

22. The cleaning device according to claim 2, further comprising a travel guide device for guiding travel of said truck to allow said truck to travel along said sunlight collecting devices arranged in a line.

23. The cleaning device according to claim 22, wherein:
said travel guide device included in the cleaning device includes a guided member provided on said truck and a guiding rail engaging with said guided member for guiding said guided member;
sunlight reflecting surfaces of said sunlight collecting devices are arranged in plural lines parallel with each other; and
said guiding rail comprises plural parallel guiding rails each extending along a respective one of the lines of said sunlight reflecting surfaces, while slide plates each fitted with extension rail portions of all of said guiding rails are provided at opposite ends of all of said guiding rails outwardly of the lines of said sunlight reflecting surfaces, said slide plates being slidable along the ground in a direction perpendicular to a longitudinal direction of said guiding rails.

* * * * *